United States Patent
Ridgell, Jr. et al.

(10) Patent No.: US 6,442,104 B1
(45) Date of Patent: *Aug. 27, 2002

(54) UNDERWATER BACKGROUND-ACOUSTICS SYNTHESIZER SYSTEM AND METHOD

(76) Inventors: James Jefferson Ridgell, Jr., 6166 Hook La., Elkridge, MD (US) 21220; Henry Jay Friedman, 601 Winhall Way, Silver Spring, MD (US) 20904; Timothy Paul Magnani, 14501 Pioneer Hills Dr., Germantown, MD (US) 20874

(*) Notice: Subject to any disclaimer, the term of this patent is extended or adjusted under 35 U.S.C. 154(b) by 0 days.

This patent is subject to a terminal disclaimer.

(21) Appl. No.: 06/407,878

(22) Filed: Aug. 13, 1982

(51) Int. Cl.[7] .................................................. G01B 9/00
(52) U.S. Cl. .................................................. 367/1; 434/7
(58) Field of Search ...................... 434/6, 7, 2; 364/718; 381/51; 367/1

(56) References Cited

U.S. PATENT DOCUMENTS

| | | |
|---|---|---|
| 3,165,734 A | 1/1965 | Grodzinski |
| 3,515,792 A | 6/1970 | Deutsch |
| 3,641,485 A | 2/1972 | Murphree et al. |
| 3,676,802 A | 7/1972 | Murphree et al. |
| 3,713,081 A | 1/1973 | Murphree |
| 3,803,336 A | 4/1974 | Williams |
| 3,829,596 A | 8/1974 | Murphree |
| 3,835,234 A | 9/1974 | Murphree |
| 3,845,572 A | 11/1974 | McCanney |
| 3,888,158 A | 6/1975 | Deutsch |
| 3,913,245 A | 10/1975 | McCanney |
| 3,979,996 A | 9/1976 | Tomisawa et al. |
| 4,003,003 A | 1/1977 | Haeberlin |
| 4,009,523 A | 3/1977 | Van Hook |
| 4,034,483 A | 7/1977 | Bernstein |
| 4,114,189 A * | 9/1978 | Davis ........................ 364/718 |
| 4,125,898 A * | 11/1978 | DeHart et al. ............... 364/718 |
| 4,194,427 A | 3/1980 | Deutsch |
| 4,198,703 A | 4/1980 | Huisveld, Jr. et al. |
| 4,200,859 A | 4/1980 | Evans et al. |
| 4,281,994 A | 8/1981 | Dell et al. |
| 4,343,218 A * | 8/1982 | Futamase ..................... 84/1.01 |
| 4,438,502 A * | 3/1984 | Fox et al. .................... 364/718 |

* cited by examiner

*Primary Examiner*—Daniel T. Pihulic
(74) *Attorney, Agent, or Firm*—Sterne, Kessler, Goldstein & Fox P.L.L.C.

(57) ABSTRACT

A synthesizer and method for the generation of underwater background acoustic signals employs digital signal generation and processing in a multiplexed format. The synthesized digital signals comprise components of shaped noise, simple sinusoids, or double-sideband, suppressed-carrier, modulated sinusoids, or a combination of one or more of these signal types. Among the acoustic signals which are digitally synthesized are acoustic signals generated by antisubmarine-warfare hardware such as sonobuoys and hydrophones.

10 Claims, 11 Drawing Sheets

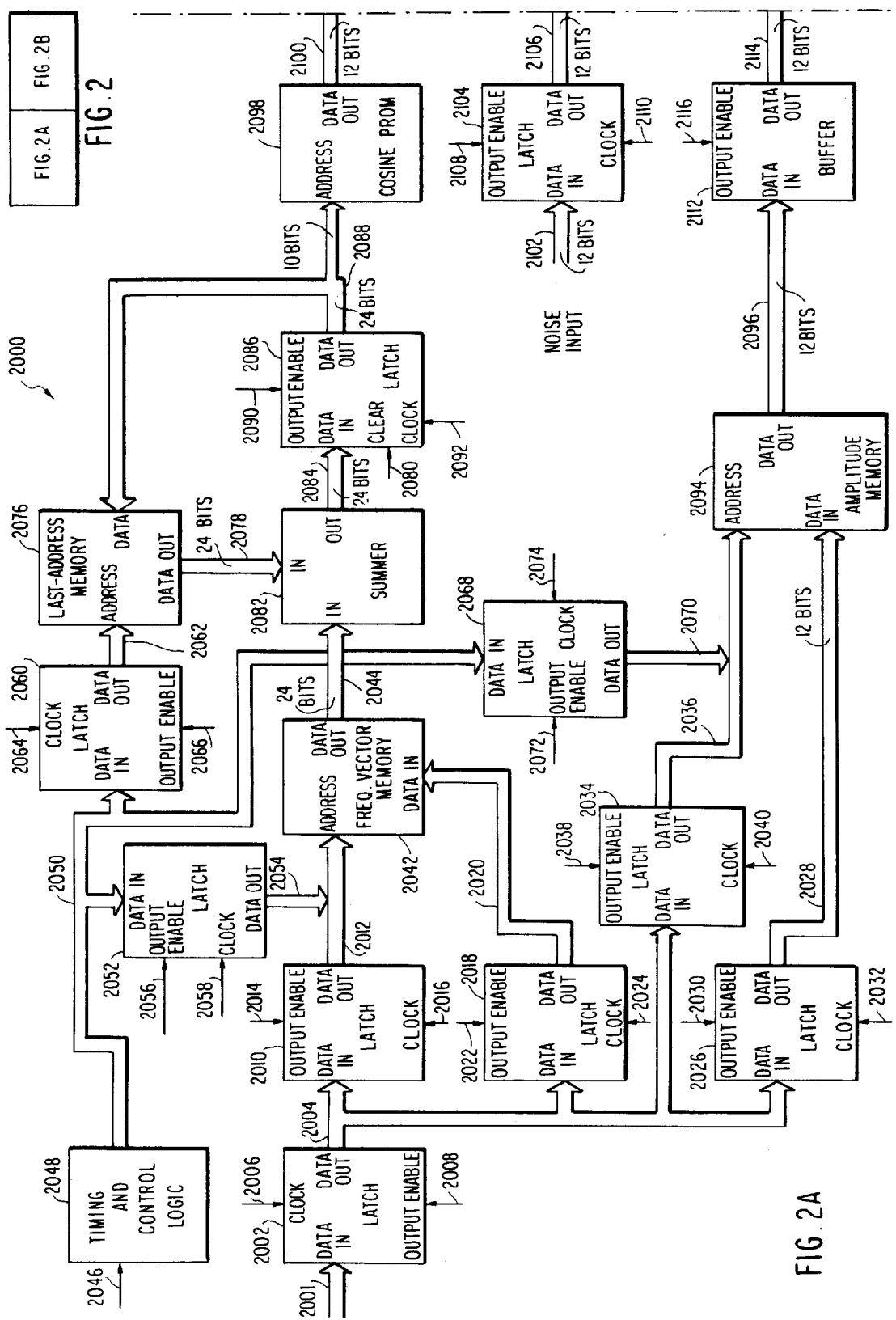

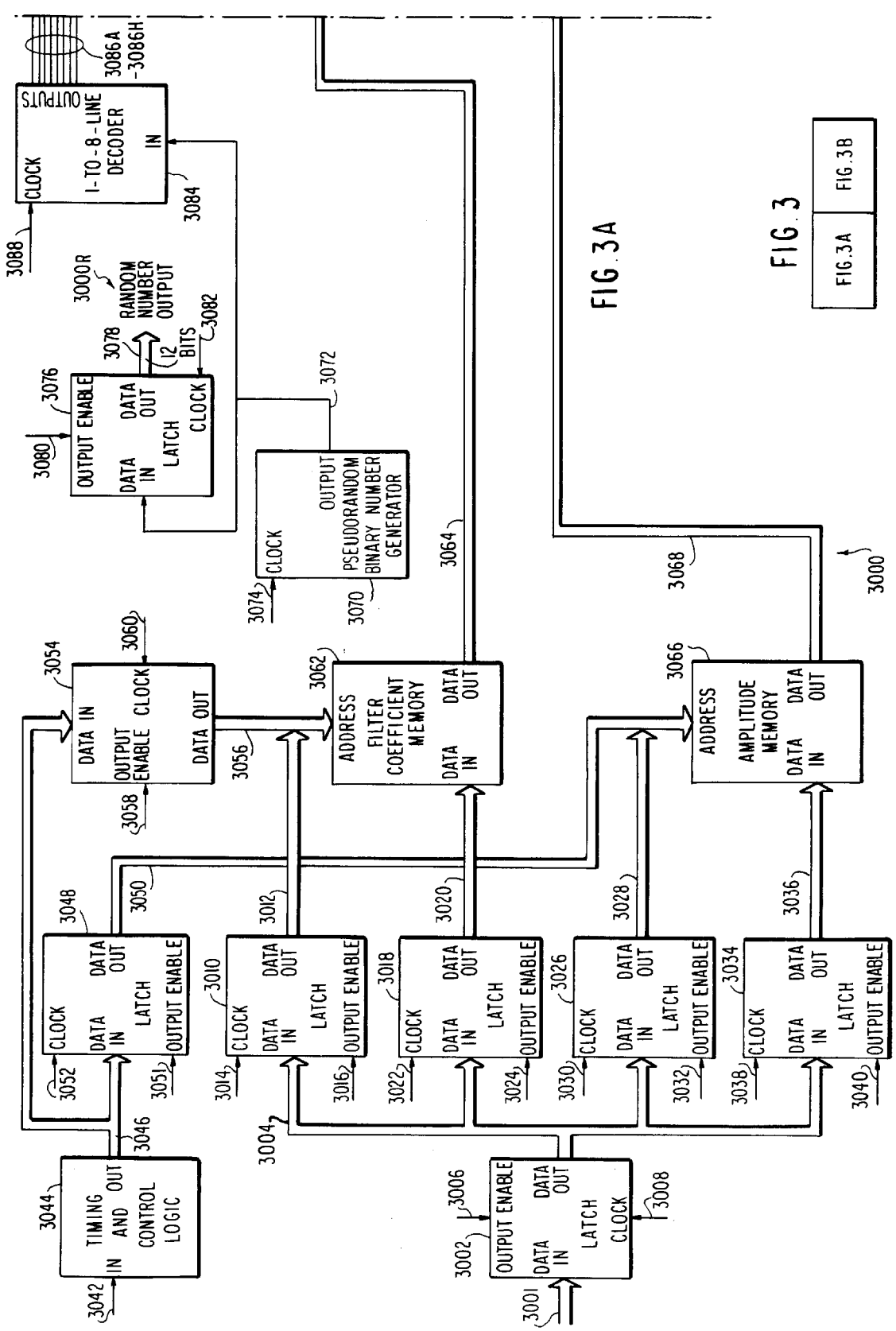

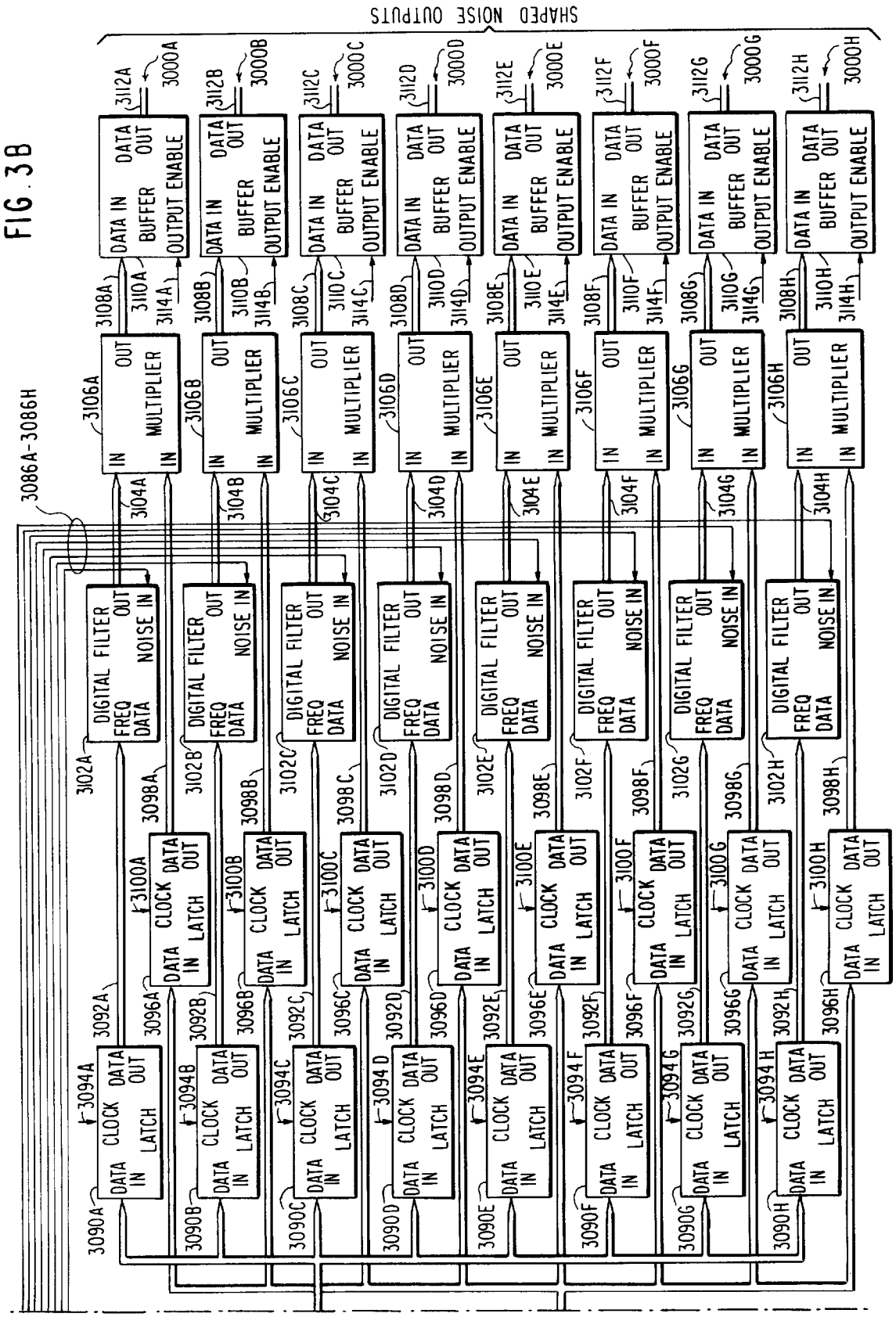

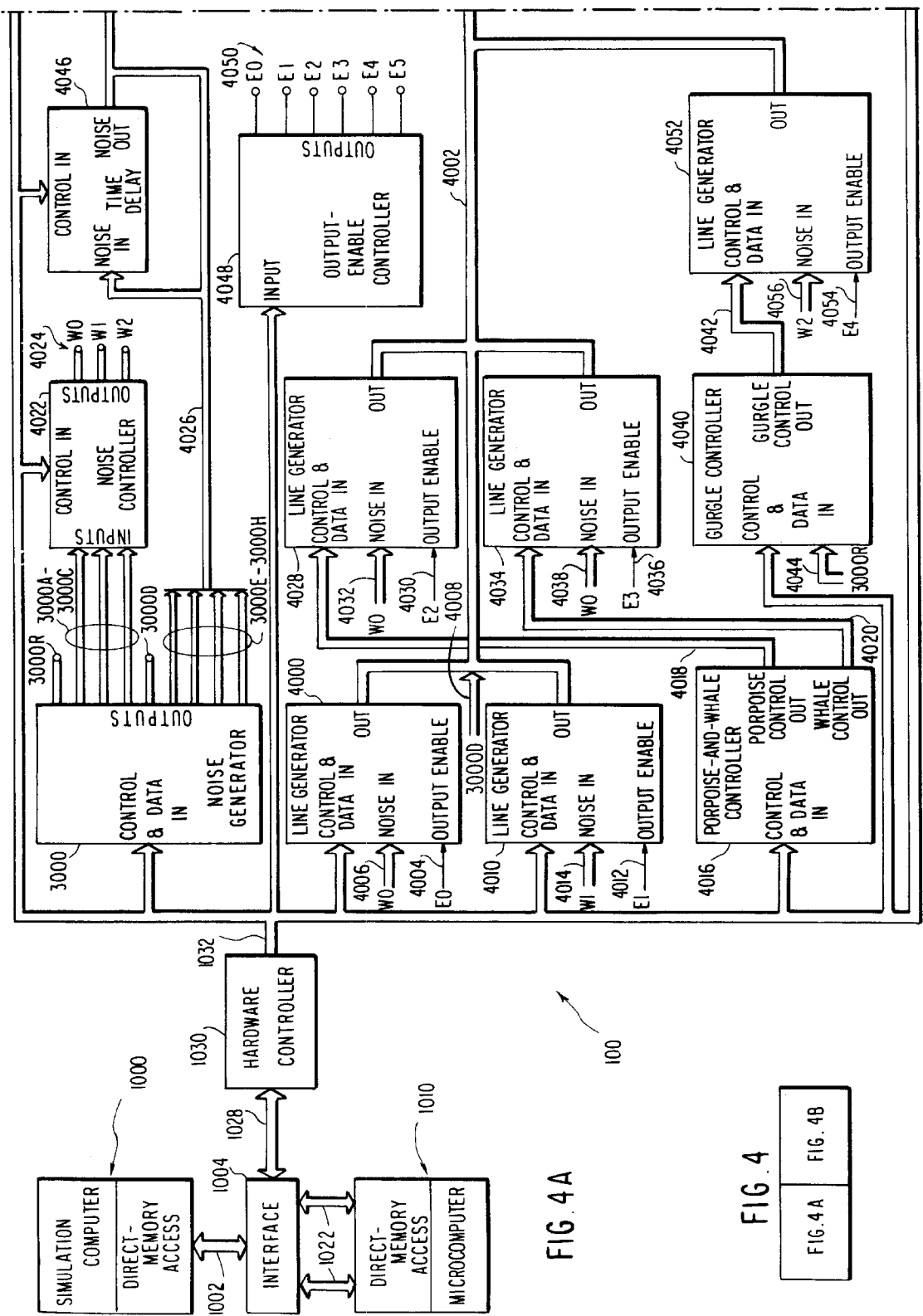

FIG. 5
| FIG. 5A |
|---|
| FIG. 5B |
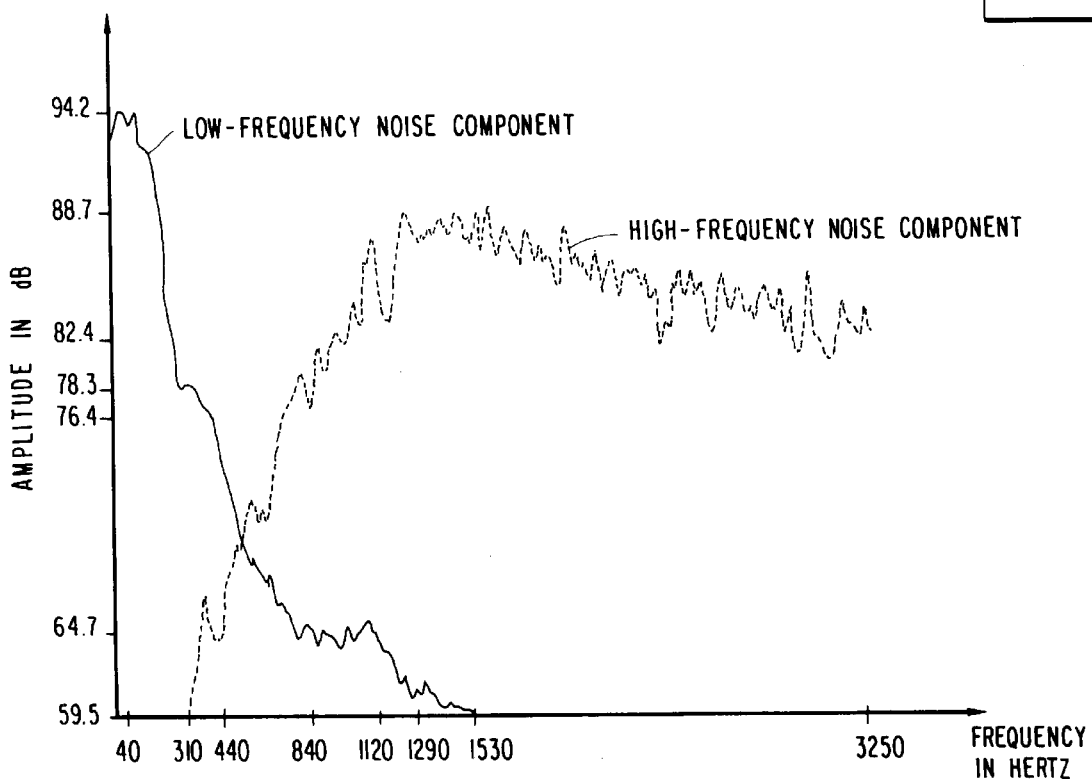
FIG. 5A
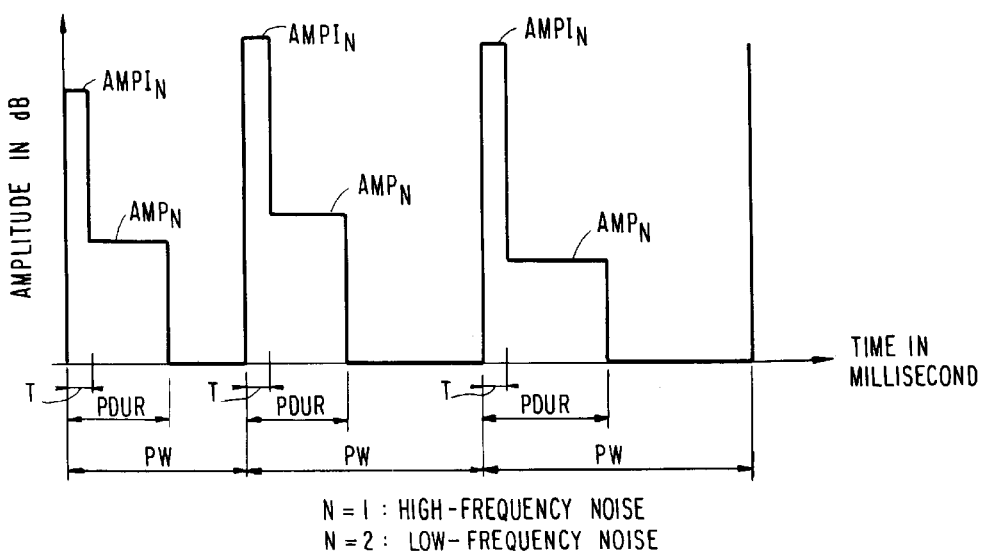
FIG. 5B

UNDERWATER BACKGROUND-ACOUSTICS SYNTHESIZER SYSTEM AND METHOD

CROSS REFERENCES TO RELATED APPLICATIONS

This application is related to the below-listed commonly assigned applications of similar title filed concurrently herewith:

(1) U.S. Ser. No. 407,884 in the names of James Jefferson Ridgell, Jr. and Henry Jay Friedman; and (2) U.S. Ser. No. 407,907 in the names of James Jefferson Ridgell, Jr., Henry Jay Friedman and Paul Edward Moyer.

The disclosures of the above-listed applications are incorporated herein in their entireties by reference as though set forth in full below.

BACKGROUND OF THE INVENTION

1. Field of the Invention

The present invention relates generally to electronic synthesis of sounds, and more particularly, to the digital synthesis of background sounds employed in training simulators which simulate antisubmarine-warfare episodes in real time.

2. Description of the Related Art

Simulators are widely employed today to train personnel in the operation of complex mechanical, electrical and electromechanical systems. A simulator acquaints personnel being trained with problems they will confront in real-life situations without exposing them to the actual risks which they would face in such situations. Such risks would be enhanced greatly by the fact that the personnel confronting them often have little, if any,experience. The use of training simulators is also cost-effective. If untrained or minimally trained personnel were, by necessity, forced to gain experience on actual operating systems, the likelihood of damage to the system or of personnel injury would be much greater precisely because serious consequences could ensue from mistakes or errors in judgment. The use of a simulator, on the other hand, permits inexperienced personnel to learn while they are seemingly performing the tasks for which they are being trained without risk of actual potentially disastrous consequences.

Training on a simulator is most effective if the environment which is created and the problems which are posed are as close to real life as are possible. Among the elements which add to the realism of the simulation are resemblance of the simulator equipment to actual equipment, close approximation of sensory information (including sights and sounds) provided to operating personnel in real-life situations, and the posing of problems which are very similar to those with which the trainees will be confronted after their training programs have been successfully completed.

The above is no less true in the training of antisubmarine-warfare personnel than is the case in any other training situation. Antisubmarine warfare today is characterized by high levels of tactical sophistication and the use of complex equipment.

In a typical antisubmarine-warfare episode, a patrol craft (typically an airplane) drops sonobuoys into the water. These sonobuoys carry hydrophones which pick up acoustic signals propagating through the surrounding water. Each sonobuoy also includes a radio transmitter which relays the acoustic signals picked up back to the patrol craft. Each sonobuoy can be set to transmit on a particular radio-frequency channel. Typically, the receiver on the patrol craft receives 36 such channels, allowing the signals from 36 out of a possible 99 sonobuoys to be monitored.

It is apparent that any simulator which is to provide a realistic simulation of an antisubmarine-warfare episode has a formidable task. The simulator must generate a number of different signals, each with different amplitude and spectral characteristics, many of which are episode related. The simulator must provide a synthesized version of a signal from a sonobuoy which depends on the location of the sonobuoy and of sound sources, relative movement between the two (which causes Doppler effects), and the operating condition of the sonobuoy.

These difficulties have resulted in the use of sophisticated computers to produce such complex simulations. Such a simulation computer is programmed with a vast amount of information and instructions corresponding to a number of antisubmarine-warfare episodes. The simulation computer keeps track of a simulation episode as defined by a training instructor.

The sounds detected by any particular sonobuoy depend on a number of factors, including the location and type of sonobuoy, the presence of noise sources in the water around the sonobuoy, the orientation of these sound sources with respect to the sonobuoy, and the operating condition of the sonobuoy.

A sonobuoy picks up ambient sea sounds, such as those produced by aquatic creatures. These ambient sounds can include, for example, those generated by humpback whales, bottlenose porpoises, and snapping shrimp. Also, sonobuoys and their hydrophone components can generate acoustic noises. For example, one of these sounds is generated when a hydrophone is lowered from a sonobuoy housing to a desired depth. Another sound is that produced by a hydrophone having a faulty lowering mechanism. Such a faulty lowering mechanism results in the hydrophone being "hung", causing it to bang against the side of the sonobuoy housing. Additional sources of sounds present in antisubmarine warfare are produced by explosions, hulls crumpling, and submarine control devices (such as rudders and ballast tanks).

It is thus clear that ambient sea sounds, including sounds produced by man-made devices, must be produced in antisubmarine-warfare simulators if authentic antisubmarine-warfare episodes are to be simulated.

In previous antisubmarine-warfare simulators, such sounds are generated by analog means such as analog oscillator circuits and analog recorders. The analog approach, however, exhibits many disadvantages. Specifically, analog means and the sound signals they produce are subject to drift and the adverse effects of component aging. Analog tape recorders have maintenance problems and allow very little control over the sounds which they reproduce. Real sounds that are taped, by their very nature, typically contain other sounds which interfere with those which are to be simulated. For example, a tape of transient sounds generated by a submarine's maneuvering system typically also contains submarine-generated sounds such as those from the submarine's power plant as well as background sea sounds. These other signals appear as spurious signal components which interfere with the sounds required for simulation of a particular tactical situation.

The digital synthesis of signals in accordance with the present invention results in much greater control over the synthesized background sound signals and allows the reproduction of sounds that are not contaminated by other, spurious components. The digital signal synthesizer of the present invention can be programmed to introduce such effects as Doppler shift, multipath, and directional characteristics. In most cases, such signal modifications can be accomplished in the present invention without any change in hardware. Rather, they can be effected by changes in the software. Because digital circuits are not subject to drift and other adverse effects which are present in analog circuits, and because digital circuits have no moving parts, initial calibration and subsequent maintenance are greatly simplified in the present invention.

SUMMARY OF THE INVENTION

The present invention is an underwater background acoustic signal synthesizer and method, which generates, on a multiplexed basis, digital signals corresponding to background or ambient antisubmarine-warfare sounds. These digitally synthesized signals are multiplexed onto a bus which conveys them to a multiplier which digitally imparts to them directional characteristics. The digital signals are then applied to a demultiplexer and digital-to-analog converter, which demultiplexes them, converts them to analog form, and assigns them to appropriate channels of an audio system. These channels correspond to the selectable channels of receiving equipment on board the patrol craft. The audio system thus functions as a dummy radio-frequency receiver, and provides audible signals corresponding to those which would be presented to a crew monitoring such a receiver during an actual antisubmarine-warfare episode.

All of the signals which are synthesized by the apparatus and method of the present invention are generated in the digital domain. To reduce the amount of hardware necessary to generate the large number of digital signals required for a realistic simulation, multiplexing is extensively employed.

In general terms, the system of the present invention comprises a first computer, a second computer, a hardware controller, a synthesizer and an output stage. The first computer, which typically is the main computer of a larger simulation system, generates first digital signals having first data signals, first address signals and first control signals. The second computer has a stored program. The second computer, which is responsive to the first computer, generates second digital signals including second data signals, second address signals and second control signals in accordance with the first digital signals and the stored program. The hardware controller, which is responsive to the second computer, generates third digital signals including third data signals, third address signals and third control signals in accordance with the second digital signals.

The synthesizer, which is responsive to the hardware controller, synthesizes fourth digital signals in accordance with the third digital signals. The fourth digital signals comprise samples of digitally synthesized hydrophone-lowering sounds. Finally, the output stage, which is responsive to the synthesizer, converts the fourth digital signals to analog output signals.

The first computer can be a mainframe computer. The second computer can be a microprocessor, associated with a first bus coupled to it, a first memory coupled to the first bus, a first interface for allowing communication between the first computer and the first bus, and a second interface for allowing communication between the first bus and the hardware controller. The first interface allows direct memory access communication between the first and second computers. The second interface allows direct memory access communication between the second computer and the hardware controller.

The first memory comprises a random-access memory. The first memory stores the stored program. The first memory also stores certain of the first digital signals.

The third data signals comprise first amplitude data words and first frequency data words. The third control signals comprise first timing signals. The synthesizer comprises a line generator, which is responsive to the third digital signals, for generating first digital sinusoids. The first digital sinusoids comprise output digital data words having sinusoidally time-varying magnitudes.

The line generator comprises a sample memory, a first addressing stage, a first timing stage, and a second output stage. A sample memory stores sinusoid samples. The first addressing stage, which is responsive to the third digital signals, reads the sinusoid samples from the sample memory. The first timing stage, which is responsive to the third digital signals, controls the reading of the sinusoid samples by the first addressing stage. The second output stage, which is responsive to the third digital signals, provides the sinusoid samples read from the sample memory. The first addressing stage includes a first port, a first storing stage, a first converting stage, and a first reading stage. The first port receives first frequency data words contained in the third data signals. The first storing stage stores the first frequency data words. The first converting stage converts the first frequency data words into first frequency address words. Finally, the first reading stage reads the sinusoid samples from the sample memory in accordance with the first frequency address words.

The first converting stage can comprise a second storing stage for storing the first frequency address words, and a first incrementing stage for incrementing the stored first frequency address words in accordance with the first frequency data words. Moreover, the second output stage can comprise a port, a storing stage, a reading stage and a multiplying stage. The port receives the first amplitude data words in the third data signals. The stage stores these first amplitude data words, while the reading stage reads the first amplitude data words from the storing stage. Finally, the multiplying stage provides first product words by multiplying the sinusoid samples and the first amplitude data words.

The synthesizer stage can further include a stage for generating first digital noise words in accordance with the third digital signals. A first port receives the first digital noise words, and a first multiplying stage provides first product words by multiplying the first digital noise words and the sinusoid samples.

The synthesizer can include a noise-generator stage having a first timing stage and a pseudorandom binary number generator stage. The first timing stage provides first timing signals in accordance with the third digital signals, and the pseudorandom binary number generator stage generates pseudorandom binary numbers in accordance with the first timing signals. The noise generator can further include a first port stage for receiving first impulse-response data words and a digital-filter stage, which is responsive to the pseudorandom binary number generator stage, for producing first filtered noise words by convolving the pseudorandom binary numbers and the first impulse-response data words. The noise generator stage can also include a second port stage for receiving first amplitude data words, a second multiplier stage and a second output stage. The first multiplier stage provides first digital noise words by multiplying the first filtered noise words and the first amplitude data words, and the second output stage presents these first digital noise words to the first output stage. The noise generator stage can also include a second output stage for converting the pseudorandom binary numbers to a first random number output.

The synthesizer stage can also include a directionality-imparting stage for imparting directional characteristics to the fourth digital signals. Specifically, the directionality-imparting stage can include a directionality-coefficient generator stage and a first multiplying stage. The directionality-coefficient generator provides directionality-coefficient data words in accordance with the third digital signals. The first multiplying stage imparts directionality characteristics to the fourth digital signals in accordance with the directionality-coefficient data words.

With respect to the multiplex aspect of the present invention, the first output stage can comprise a plurality of first output channels, and a routing stage for routing the fourth digital signals to these plurality of first output channels in accordance with the third digital signals. In addition, the first output stage can include a digital-to-analog converter stage converting the fourth digital signals to analog output signals, and a first analog output channel stage for receiving the analog output signals. In addition, the first output stage can further include a low-pass filter stage, interposed between the digital-to-analog converter stage and the first analog output channel stage, for low-pass filtering the analog output signals.

The present invention generates hydrophone-lowering sounds.

The hydrophone-lowering sound comprises a high-pass-filtered noise and a low-pass filtered noise, which are summed together to produce a summed noise. The summed noise has an envelope of random pulsation. The high-pass-filtered noise contains spectral components distributed upward from approximately 200 to 600 Hertz, whereas the low-pass-filtered noise contains spectral components distributed below approximately 800 Hertz.

The synthesizer stage comprises a hydrophone-lowering stage for synthesizing the hydrophone-lowering sound. The hydrophone-lowering stage can include a first stage for generating high-pass-filtered digital noise words in accordance with the third digital signals, a second stage for generating low-pass-filtered digital noise words in accordance with the third digital signals, and a third stage for providing summed noise words by summing the high-pass-filtered digital noise words and the low-pass-filtered digital noise words.

BRIEF DESCRIPTION OF THE DRAWINGS

The below-listed Figures correspond to like numbered Figures present in the above-listed assigned applications of similar title filed concurrently herewith.

Various aspects, features, and attendant advantages of the present invention will be more fully appreciated as the same becomes better understood from the following detailed description when considered in connection with the accompanying drawings in which:

FIG. 2 illustrates diagrammatically the relationship between FIGS. 2A and 2B;

FIG. 2A illustrates in block-diagram form the input and certain of the signal-generating stages of the line generators employed in the system of the present invention;

FIG. 3 illustrates diagrammatically the relationship between FIGS. 3A and 3B;

FIG. 3A illustrates in block-diagram form the input and certain of the signal-generating stages of the noise generator employed in the system of the present invention;

FIG. 3B illustrates in block-diagram form the remaining signal-generating and the output stages of the noise generator employed in the system of the present invention;

FIG. 4 illustrates diagrammatically the relationship between FIGS. 4A and 4B;

FIG. 4A illustrates in block-diagram form the computing and certain of the signal-generating stages of the underwater background acoustics synthesizer system of the present invention;

FIG. 5 illustrates diagrammatically the relationship between FIGS. 5A and 5B;

FIG. 5A illustrates the spectral characteristic of the low-pass-filtered noise and the high-pass-filtered noise generated in the synthesis of hydrophone-lowering sounds;

FIG. 5B illustrates the time-varying envelopes generated and imparted to the low-pass-filtered noise and the high-pass-filtered noise in the synthesis of the hydrophone-lowering sounds;

I. GENERAL OVERVIEW

Figure 1:
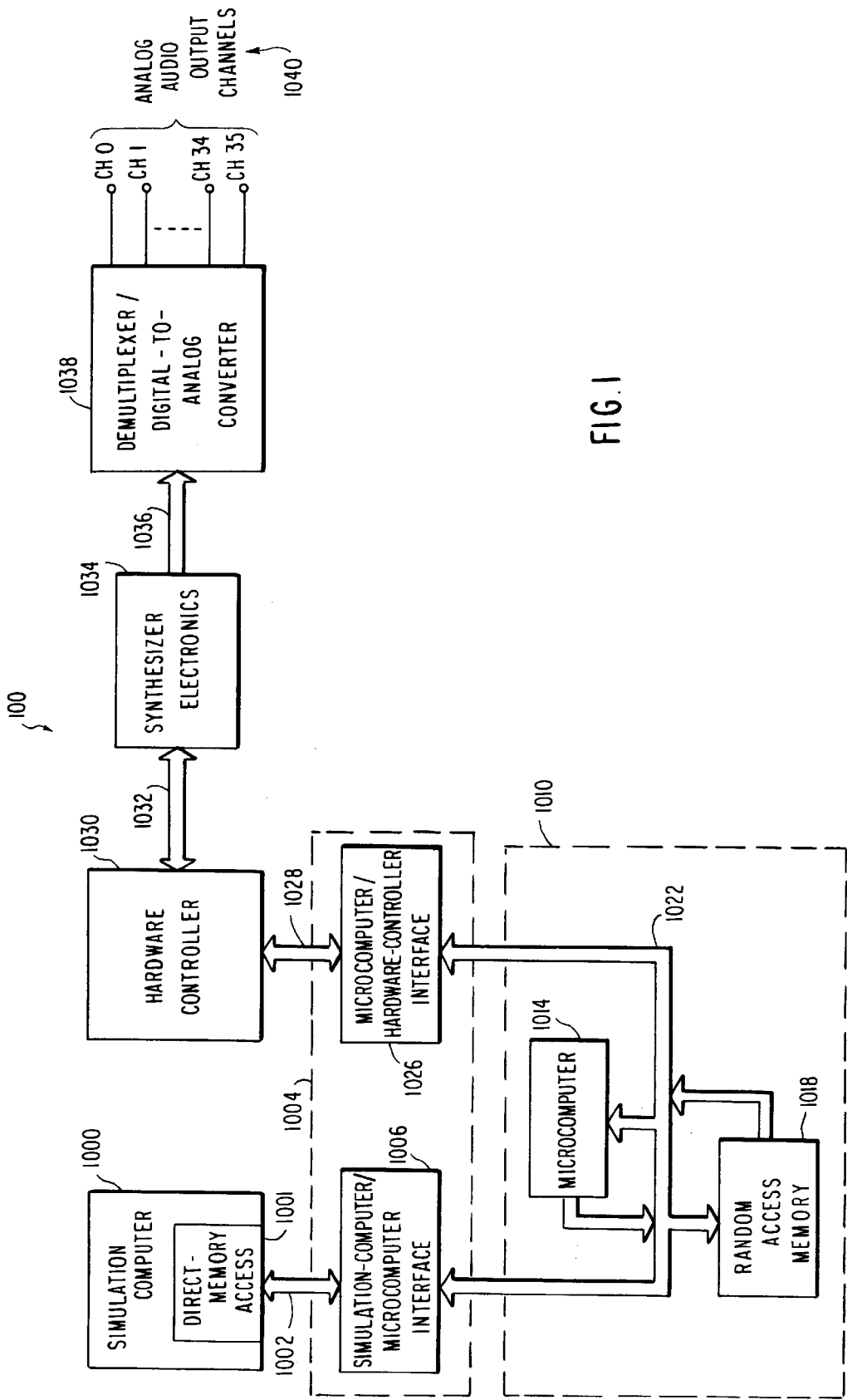
FIG. 1 illustrates in simplified block-diagram form the underwater background acoustics synthesizer system of the present invention.

Reference is now made to the drawings, in which the same reference numerals refer to identical, similar or corresponding stages or steps.

FIG. 1 shows a simplified functional block-diagram of an underwater background-acoustic synthesis system according to the present invention. The underwater background-acoustic synthesis system is designated generally by reference numeral 100.

The system and method of the present invention generates simulations of seven types of audible background sounds which are found in antisubmarine-warfare environments. Some of these background sounds are produced by aquatic creatures which live in sea environments—snapping shrimp, porpoises, and whales. Other of these sounds are generated by submarine and antisubmarine-warfare hardware—submarines, explosive charges, and sonobuoys. The sounds which fall into this latter category include hydrophone gurgle, hydrophone lowering, malfunctioning (hung) hydrophone, explosions and hull-crumple, and submarine transients (ballast discharge and hydraulically-actuated rudder movement).

The digital synthesis by the present invention of each of these background sounds will be discussed individually after presentation of a brief explanation of multiplexing, an explanation of the two basic types of signal generators employed by the present invention, and a closer, overall look of the system 100 embodiment.

It should be noted that in the disclosed embodiment the design of the digital circuits which synthesize the underwater background-acoustic signals limits the upper frequency of the synthesized signal components to approximately 3,276.8 Hertz. In actuality, some of the sounds that are synthesized contain frequency components considerably above the upper frequency limit of system 100. However, it is the opinion of the inventors that reasonable simulations of the actual sounds are produced, notwithstanding the reduced bandwidth of the synthesized signals.

A. Multiplexing

Multiplexing involves sequentially impressing signals from a number of different sources onto a common path or bus at appropriate instants of time. Multiplexing reduces the number of paths required to conduct signals within a system. Where a number of signals with similar spectral content and amplitude are required, one common signal-generating stage can be employed to provide consecutive instantaneous samples of the required signals. These signals (or rather, samples of signals) are processed rapidly enough so that when they are reconstructed into continuous wholes, no significant information is lost. Demultiplexing and reconstruction of continuous signals occurs only after all significant signal-processing steps have been completed.

Crucial to the successful multiplexing of signals from digital sources onto a common path or bus is the isolation of the active portions of those sources from the common path or bus during those portions of a time frame which are allotted to signals from other sources. This is accomplished by the well-known technique of three-state buffering. A three-state buffer is a stage which has three possible output states: logic zero, or (in positive logic) a low voltage level; logic one, or a high voltage level; and a third, high-impedance or OFF state. During those portions of a time frame which are allotted to another signal source, a three-state buffer is driven to its high-impedance or OFF state by means of an appropriate control signal. The output devices of the buffer then act essentially as open circuits which prevent signals at their inputs from reaching the common path or bus and also prevent signals on the bus from reaching the active portions of such signal sources. The use of three-state buffering avoids the undesired condition which occurs when the signal levels on the input side of the buffer are different from those currently on the bus.

B. General System Description

Referring now to FIG. 1, a simulation computer 1000 oversees generally the training episode being simulated. Simulation computer 1000 operates in accordance with a stored program (not shown), which is responsive to a large number of variables.

In a preferred application simulation computer 1000 controls an antisubmarine-warfare training simulator. In such an application, simulation computer 1000 keeps track of the locations and activities of, for example, a patrol craft and three targets (submarines), and of up to 99 simulated sonobuoys.

It should be understood that the present invention is not dependent on the stored program utilized by simulation computer 1000, nor is it limited to an antisubmarine-warfare simulation application. The present invention can be employed in any application requiring underwater background sounds, and the antisubmarine-warfare simulation application is used merely for purposes of explanation.

The realism of the simulation is enhanced through the digital generation by the present invention of underwater background acoustic signals normally encountered in antisubmarine warfare. Simulation computer 1000, which typically is a main frame computer, has a direct-memory access (DMA) port 1001, which permits it to communicate with a microcomputer shown generally at 1010 via a bidirectional bus 1002, a simulation computer/microcomputer interface section 1006 of an interface shown generally at 1004, and a bidirectional microcomputer data bus 1022. Simulation computer generates first digital signals including first data signals, first address signals, and first control signals.

Simulation computer 1000 is of conventional design. A suitable form for simulation computer 1000 is a Model H800 made by Harris Corporation of Fort Lauderdale, Fla. Bidirectional bus 1002 is of conventional design.

Bidirectional bus 1002 allows data to enter and exit the direct-memory-access port 1001 of simulation computer 1000. It should be understood that simulation computer/microcomputer interface 1006 allows simulation computer 1000, whose output, for example, has a Harris Buffered Block Channel data format, to communicate with a microprocessor 1014 present in microcomputer 1010 via bidirectional data microcomputer data bus 1022.

Microcomputer 1010 contains microprocessor 1014, a random-access memory 1018 and bidirectional microcomputer data bus 1022. Microprocessor 1014 is of conventional design. A suitable microprocessor is the M68000 made by Motorola, Incorporated of Phoenix, Ariz. While microprocessor 1014 utilizes a 16-bit format, a microprocessor employing an 8-, 12-, 32- or other-bit format could be used. Further, microcomputer 1010 can be a computer of a type other than a microcomputer.

Random-access memory 1018 is of conventional design and has a storage capacity of 128 kilobytes. A suitable form for random-access memory 1018 is a MC6882B made by Motorola, Inc. of Phoenix, Ariz. Random-access memory 1018 is programmed to store a program which causes microprocessor 1014 to generate second digital signals (that is, data, address, and control signals). These second digital signals are provided via bidirectional microcomputer data bus 1022, a microcomputer/hardware-controller interface section 1026 of interface 1004, and bidirectional data bus 1028 to a hardware controller 1030, which coordinates the generation in multiplexed fashion of the various samples of the digitally synthesized underwater background sounds. Bidirectional microcomputer data bus 1022 is of conventional design.

Random-access memory 1018 also stores data which are supplied by simulation computer 1000 and which are provided to hardware controller 1030. It should be understood that any suitable data-storage device can be employed for random-access memory 1018 as long as it has sufficient memory capacity and operating speed to enable microprocessor 1014, under control of the program stored in random-access memory 1018, to generate the desired control signals.

As stated above, microcomputer 1010, via hardware controller 1030, effectively controls the samples of the digital synthesis of underwater background acoustic signals in accordance with the present invention. Although it is possible in certain applications for simulation computer 1000 to perform these functions, the use of simulation computer 1000 instead of microcomputer 1010 would result in several disadvantages.

Specifically, direct control of the digital synthesis of background sounds by simulation computer 1000 would require a significant increase in the complexity of the stored program (not shown) which models the antisubmarine-warfare episode to be simulated. Also, relative to other functions which simulation computer 1000 must perform, the digital synthesis of underwater background sounds in accordance with the present invention is a fast process. Thus, requiring simulation computer 1000 to control directly the synthesis of underwater background sounds would consume a significant amount of available computing time, which computing time simulation computer 1000 may already need in order to effectuate properly the antisubmarine-warfare episode that is being simulated in real time. To create the additional computing ability that would be needed, simulation computer 1000 would have to operate at a higher speed. That would result in an increase in the cost of simulation computer 1000 that in many instances would exceed the cost of microcomputer 1010 and its related hardware and software.

In addition, direct control of the digital synthesis of underwater background sounds would also require increased data-storage capabilities in simulation computer 1000. Given the length of the antisubmarine-warfare training-exercise program that simulation computer 1000 must store, the additional memory capacity required to store the program for controlling the digital synthesis of the background sounds could in many applications render impracticable the use of a particular mainframe computer having other desirable characteristics as simulation computer 1000. Finally, the use of microcomputer 1010 facilitates the integration of the present digital sound synthesizer into other computerized antisubmarine-warfare simulators as well as other types of simulators.

It should be understood that when the synthesizer embodiment of the present invention is employed in a simulator system using a simulation computer 1000 other than a Model H800, only minor modifications are required in most cases. Specifically, only appropriate software changes in microcomputer 1010 and possibly hardware or software changes in simulation computer/microcomputer interface 1006 are typically required.

The data format of microcomputer 1010 differs from that of hardware controller 1030. Specifically, in the embodiment shown, a Motorola Versabus® data format is utilized by microcomputer 1010, while the Harris Buffered Block Channel data format (mentioned earlier) is utilized by the first port of hardware controller 1030. Hence, microprocessor/hardware-controller interface 1004 acts as a data-format transformer between microcomputer 1010 and hardware controller 1030 so that the two functional stages can effectively communicate.

It should be noted that microprocessor/hardware-controller interface 1026 can be eliminated in embodiments of the present invention where the data format of microcomputer 1010 is identical to the data format of hardware controller 1030.

Hardware controller 1030 acts as a buffer and controller. Hardware controller 1030 receives second digital signals from microcomputer 1010 via bidirectional microcomputer data bus 1022, microcomputer/hardware-controller interface 1026, and bidirectional bus 1028. Hardware controller 1030 applies third digital signals, including data, address, and control bits or signals via bidirectional bus 1032 to a synthesizer electronics stage shown generally at 1034.

Synthesizer electronics stage 1034 comprises all of the circuits which perform the actual synthesis of underwater background acoustic signals. The output of each signal-generating circuit is impressed in multiplexed fashion onto an output bus 1036. The signals on output bus 1036, which are denominated fourth digital signals and comprise samples of digitally synthesized sounds, are fed to a demultiplexer digital-to-analog converter 1038. Demultiplexer/digital-to-analog converter 1038 performs two functions. It assembles the digital samples of the various background acoustic signals into appropriate groups for each of, for example, 36 sonobuoy channels. It then converts them from digital into analog form for application to audio transducers and other signal processing stages via a set of, for example, 36 output channels 1040.

C. Synthesizer Electronics

Synthesizer electronics 1034, which is responsive to the hardware controller, includes both signal generators and signal-processing stages for synthesizing the fourth digital signals. Two primary types of signal generators are employed—line generators and noise generators. A line generator is a digital circuit which synthesizes binary representations of sinusoidal signals. A noise generator is a digital circuit which generates digital noise signals which are sequences of of pseudorandom binary numbers. Each type of signal generator will now be discussed in detail.

1. The Line Generator

The line generators employed in the disclosed system 100 embodiment of the present invention can generate output samples at the sampling frequency $f_s$ of the system, which is 6,553.6 Hertz. The sampling frequency $f_s$ can be from 500 to 7,000 Hertz, depending on the desired highest frequency for the signals being generated. By the Nyquist criterion, the highest signal frequency that can be usefully obtained from the line generator in this embodiment is therefore 3,276.8 Hertz. The output samples provided by each line generator are actually summed composites of generated digital samples of digital sinusoids of eight individual frequency components or lines. Note that these frequency components or lines need not be harmonically related.

Figure 2B:
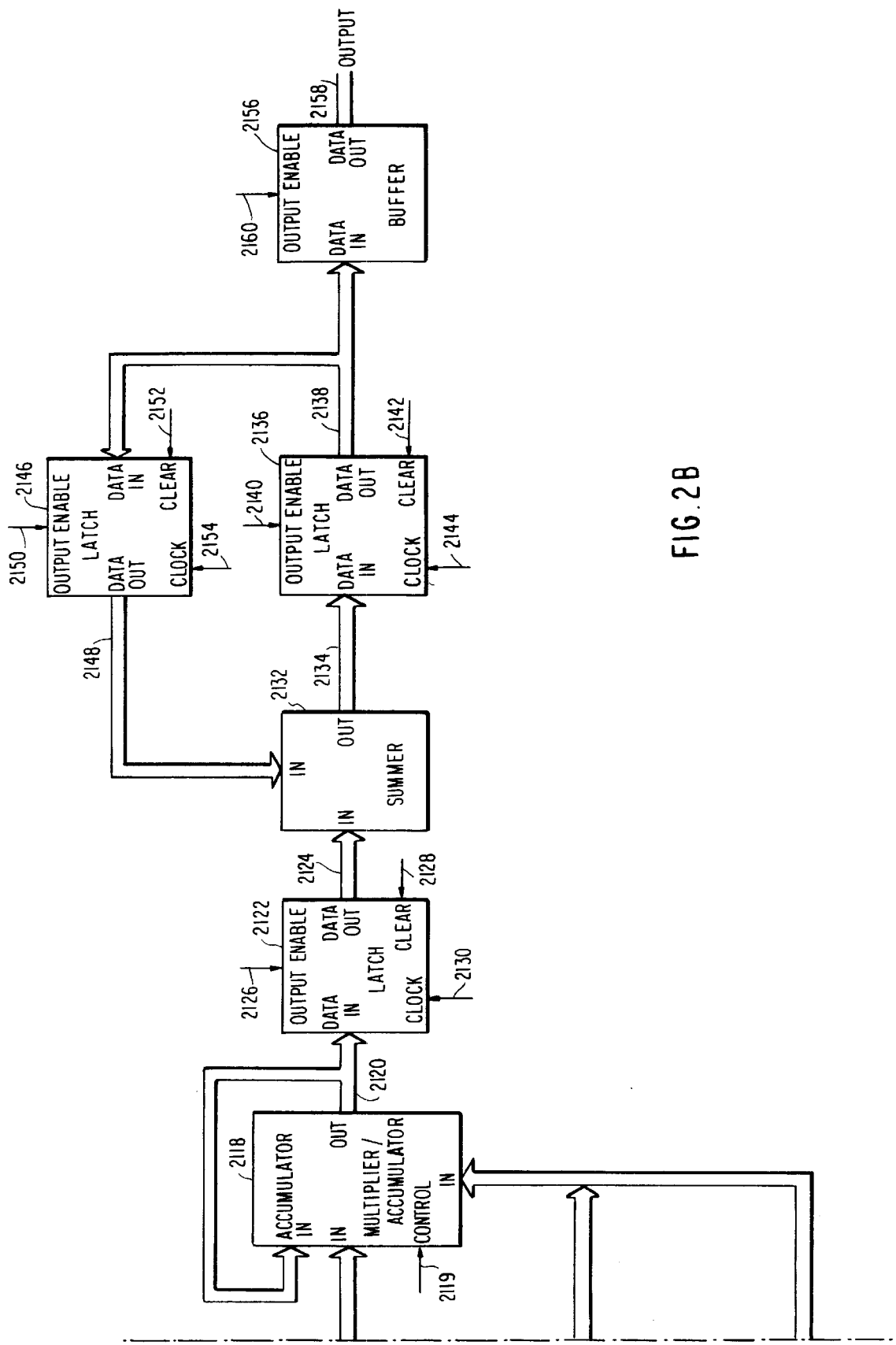
FIG. 2B illustrates in block-diagram form the remaining signal-generating and the output stages of the line generators employed in the system of the present invention.

The line generators employed in the present invention are shown in functional block-diagram form in FIG. 2. The heart of the line generator, which is designated generally by reference numeral 2000, is a sample memory, designated as a cosine programmable, read-only memory or PROM 2098. Cosine PROM 2098 is a conventional 12-bit by 1024-word memory which contains digital data describing 1024 samples of a cosine function over one period. It should be understood that other types of memories can be employed for PROM 2098, such as a random access memory. In essence, digital sinusoids are generated by reading data from appropriate addresses of cosine PROM 2098.

Scanning a memory containing samples of a waveform to be synthesized is well known in the art. If each location in such a memory is sequentially read at a given rate, and the data words appearing at the output of that memory are applied to a digital-to-analog converter and then to a low-pass filter, an analog signal will appear at the filter output having a fundamental frequency defined by the equation:

$$f_o = f_s/N \quad [1]$$

where $f_o$ equals the fundamental frequency, $f_s$ equals the sampling rate, and N is the number of samples.

To generate a range of fundamental frequencies, either the sampling rate $f_s$ or the number N of stored samples which describe the waveform to be synthesized must be variable, These methods of varying $f_o$, however, are not acceptable for the following reasons. N must be very large for small values of $f_o$, and values of $f_s$ large enough to satisfy the Nyquist criterion for frequencies toward the upper end of the audible range. Varying the number of samples N to vary the fundamental frequency $f_o$ also requires that new samples of the desired waveform be provided to the memory device for each change in $f_o$. This latter requirement rules out the use of a standard PROM such as cosine PROM 2098 as the memory device which stores the N samples.

If the sampling rate $f_s$ is changed to vary the fundamental frequency $f_o$, a fixed-frequency, low-pass filter cannot be used to remove the aliasing spectrum generated during the sampling process. Rather, a "sliding" low-pass filter must be used to accommodate the sampling rate variable $f_s$. Such a sliding filter is usually complex and difficult to implement. Also, the generation of a periodic signal such as the one under discussion is usually only one portion of a larger data-processing system which operates at a fixed master clock rate. A varying sampling rate $f_s$ would not be compatible with such a system.

In the example just presented, it was assumed that each location of the memory device is sequentially addressed. However, it is possible to vary the output frequency of such a system by selecting an increment between addressed locations of the memory device which is greater than or equal to one. This increment, I, can have integer values within the range of 0 to (N/2)−1, where the upper value is determined by the Nyquist criterion. Thus, if I has a value of 2, alternate locations of the memory device will be addressed. If I=2, and $f_s$ and N remain constant, an output frequency which is twice that specified by equation [1] will be obtained. Such a system can generate waveforms only of frequencies defined by the relationship:

$$f = I f_o \qquad [2]$$

where f is the frequency to be generated.

The serious limitation of such a signal generating scheme is that the output frequencies f can only be integral multiples of $f_o$.

Referring again to FIG. 2, line generator 2000 of the present invention digitally generates fundamental frequencies over a large frequency range in a manner which avoids the limitations just discussed. The technique employed is a slip-sample algorithm. Many different values of output frequencies $f_1$ can be obtained without varying the sampling rate $f_s$ or the number N of samples stored in cosine PROM 2098. The equation which defines the output frequency $f_1$ generated by the slip-sample algorithm employed in the present invention is:

$$f_1 = f_s(M/N) \qquad [3]$$

where M is an address increment having an integer component I (as discussed earlier) as well as a fractional component F.

If M is made less than one, a waveform can be generated having an output frequency $f_1$ which is smaller than the original fundamental frequency $f_o$. Note that $f_1$ can vary with smaller increments than was the case defined by equation [2]. The size of this increment is directly related to F.

The slip-sample algorithm (equation 3) is performed digitally by computing the following recursive equation:

$$P(t) = P(t-1) + M \qquad []$$

where P(t) is the address of the sample
memory at time t, and
P(t−1) is the previous address of the sample memory (the address at time t−1).

The address or pointer terms of the recursive equation (equation 4) have integer and fractional components designated, for example, as $P_I(t)$ and $P_F(t)$, respectively. The integer component $P_I(t)$ is used to address cosine PROM 2098. The fractional component $P_F(t)$ is accumulated and does not contribute to the address applied to cosine PROM 2098 until its value overflows into the least-significant integer bit.

The slip-sample algorithm (equation 3) requires that the sampled memory pointer P(t−1) and the index M be calculated and maintained at a precision greater than the increment between adjacent addresses of cosine PROM 2098. The integer portion $P_I(t)$ of the sum of the pointer P(t−1) and index M, which has the same precision as the increment between adjacent addresses of cosine PROM 2098, is used to address the location of cosine PROM 2098 containing the waveform sample to be read. The following example illustrates this.

Suppose that cosine PROM 2098 contains a number N of samples equal to 1024, assume that pointers P(t−1) and P(t) as well as index M are described by 16 bits, with 5 bits to the right of the binary decimal point. Also assume that the value of M is 0.5. If pointers P(t) and P(t−1) are initialized to zero, the location of cosine PROM 2098 corresponding to its least-significant address will be read. To generate the next address, the recursive equation (equation 4) will be implemented. The index M will be added to pointer P(t−1) to yield a value of pointer P(t) of 0.5 decimal or 0000000000.10000 binary. Because only the ten most significant bits of pointer P(t) are used to address cosine PROM 2098, and because these ten most significant bits are all binary 0's, the location of cosine PROM 2098 described by the least significant address word is read again. It is not until the second incrementation of the recursive equation (equation 4) that the address word applied to cosine PROM 2098 is incremented by a factor of binary 1. If this process is allowed to continue, it is apparent that each location of cosine PROM 2098 is addressed twice before the next sequential memory location is addressed. It is this double addressing of each address of cosine PROM 2098 that allows line generator 2000 of the present invention develop an output frequency $f_1$ that is one-half the fundamental frequency $f_o$. Thus, by selecting a particular value of index M, a desired output frequency $f_1$ can be generated over a wide range and with greater precision than would be otherwise possible.

Referring again to FIG. 2 and particularly FIG. 2A, line generator 2000 includes a latch 2002, which receives various sets of data bits (also called frequency data words) via a set of data lines 2001. Latch 2002 has three-state outputs whose activity is governed by the logic level applied to the output-enable input of latch 2002 via a signal line 2008. Latch 2002 loads the data bits presented to its data-input terminals when it receives a pulse at its CLOCK input via a signal line 2006. Latch 2002 passes its stored data to one of four latches 2010, 2018, 2026 and 2.034 via a set of data lines 2004.

Latch 2010 provides address bits to the address input of a frequency vector memory 2042 via a set of data lines 2012. Latch 2010 loads data when it receives a clock pulse via a signal line 2016 and has three-state outputs governed by the logic level on a signal line 2014. Data are written into frequency vector memory 2042 via latch 2018, which presents data words to the data-input terminals of frequency vector memory 2042 via a set of signal lines 2020. Latch 2018 loads data when a clock pulse is received via a signal line 2024, and presents the loaded data at its data-output terminals when the appropriate logic level is present on a signal line 2022. Data are loaded into frequency-vector memory 2042 via latch 2018 only during an initialization interval. During this loading process, the appropriate addresses are supplied to frequency-vector memory 2042 via latch 2010. Frequency-vector memory 2042 contains data words describing values of the index M of the recursive equation discussed earlier. Index M is employed as a frequency vector in the digital synthesis of sinusoids., Different values of M are loaded so that desired output frequencies can be generated.

Latches 2026 and 2034 supply data and address words, respectively, to an amplitude memory 2094. The amplitude data words are latched from data lines 2004 by latch 2026 when a clock pulse is applied to latch 2026 via a signal line 2032. The latched data appear at the data-output terminals of latch 2026 when the appropriate logic level is applied to the output-enable terminal of latch 2026 via a signal line 2030. When this occurs, the latched data word is applied to the data-input terminals of amplitude memory 2094 via a set of data lines 2028. Address words for amplitude memory 2094 are taken from data lines 2004 by latch 2034 when a clock pulse is applied to latch 2034 via a signal line 2040. The latched data appear at the data-output terminals of latch 2034 when the appropriate logic level is applied to the output-enable input of latch 2034 via a signal line 2038. The data words which appear at the data-output terminals of latch 2034 are applied to the address inputs of amplitude memory 2094 via a set of data lines 2036. Data are read into amplitude memory 2094 during an initialization process, and can be updated as required.

Amplitude memory 2094 contains data words describing the amplitudes of the individual frequency lines which are generated by line generator 2000. How the data stored in amplitude memory 2094 determines the output amplitudes of the frequency lines will be discussed later. Once the appropriate data have been loaded into frequency-vector memory 2042 and amplitude memory 2094, latches 2010 and 2034 are not used. Rather, frequency-vector memory 2042 and amplitude memory 2094 are addressed by words generated by a timing-and-control-logic stage 2048.

Timing-and-control-logic stage 2048 receives a master clock signal via a signal line 2046 and generates address words for the memories 2042 and 2094, as well as for a last-address memory 2076. Timing-and-control-logic stage 2048 also generates clock and output-enable signals for the various other stages of line generator 2000. The connections between timing-and-control-logic stage 2048 and the various-clock and output-enable signal lines are not shown only for the sake of simplicity. Timing-and-control-logic stage 2048 generates address words for memories 2042, 2076 and 2094 for each of the eight frequency lines which can be generated. These address words appear on a set of data lines 2050.

A latch 2052 handles the address words intended for frequency-vector memory 2042. It accepts an address word from data lines 2050 when a clock pulse appears on a signal line 2058. The address word loaded into latch 2052 appears at its data-output terminals when the appropriate logic level is applied to the output-enable terminal of latch 2052 via a signal line 2056. This address word is applied to the address-input terminals of frequency-vector memory 2042 via a set of data lines 2054 and data lines 2012.

The address words intended for last-address memory 2076 are accepted by a latch 2060 when a clock pulse appears on a signal line 2064. The latched address word appears at the data-output terminals of latch 2060 when the appropriate logic level is applied to the output-enable terminal of latch 2060 via a signal line 2066. The address word is applied to the address-input terminals of last-address memory 2076 via a set of data lines 2062.

The address words for amplitude memory 2094 are applied via data lines 2050 to the data-input terminals of a latch 2068. Latch 2068 loads an address word when a clock pulse appears on a signal line 2074. The latched data word appears at the data-output terminals of latch 2068 when the appropriate logic level is applied to the output-enable terminal of latch 2068 via a signal line 2072. When this occurs, the latched data word is applied to the address-input terminals of amplitude memory 2094 via a set of data lines 2070 and data- lines 2036.

Last-address memory 2076 contains the values of pointer P(t−1) for each of the eight frequency lines being synthesized which were previously applied to the address-input terminals of cosine PROM 2098. The values in this embodiment are described by 24 bits each. Only the 10 most significant bits are applied to the address inputs of cosine PROM 2098. These 10 bits describe the integer portion of the pointer.

At the beginning of the operation of line generator 2000, and after the initial loading of frequency-vector memory 2042 and amplitude memory 2094, the contents of latch 2086 are reset to zero by means of a pulse applied to the CLEAR input of latch 2086 via a signal line 2080. This zero value is loaded into the appropriate location of last-address memory 2076 for each frequency line. Then, timing-and-control-logic stage 2048 begins to generate address words for each frequency line. Last-address memory 2076 and frequency-vector memory 2042 are addressed so that appropriate data words are read from them. The data word read from frequency-vector memory 2042 is applied to one input of a summer 2082 via a set of data lines 2044. The last address (which is initially zero) read from last-address memory 2076 is applied to the remaining input of summer 2082 via a set of data lines 2078.

As was mentioned earlier, frequency-vector memory 2042 and last-address memory 2076 contain 24-bit data words whose 14 least-significant bits are to the right of the binary decimal point. Summer 2082 adds the two data words read from frequency-vector memory 2042 and last-address memory 2076 and applies them to latch 2086 via a set of data lines 2084. Latch 2086 loads the 24-bit sum when a clock pulse is applied to its CLOCK input via a signal line 2092. The latched sum appears at the data-output terminals of latch 2086 when the appropriate logic level is applied to the output-enable terminal of latch 2086 via a signal line 2090.

When this occurs, the 24-bit latched word appears on a set of data lines 2088. Only the ten most significant bits of this latched address word are applied to the address-input terminals of cosine PROM 2098. However, the full 24-bit address word is applied to the data-input terminals of last-frequency memory 2076, which stores it in the memory location determined by the address word applied to the address-input terminals of last-address memory 2076.

Appearing at the data-output terminals of cosine PROM 2098 is the data word (12 bits) describing the cosine sample stored in the addressed memory location of cosine PROM 2098. This data word is applied to one input of a multiplier 2118 via a set of data lines 2100. In line with the discussion earlier, frequency-vector memory 2042 and last-address memory 2076 are sequentially addressed to read out stored data for each frequency line.

Frequency-vector memory 2042, last-address memory 2076, summer 2082, and latch 2086 interact to implement the recursive equation (equation 4) for each frequency line. Each time the fractional portion of the sum generated by summer 2082 overflows into the integer data bits, the address word for cosine PROM 2098 is incremented. The last-address pointers are stored in the last-address memory 2076 for successive summation with the appropriate frequency-vector values so that cosine PROM 2098 is scanned at appropriate increments for the desired output frequencies to be generated for the eight lines. Thus, cosine PROM 2098 is read by eight different address words during each sampling period.

When a sample read from cosine PROM 2098 is applied to one input of multiplier/accumulator 2118, amplitude memory 2094 is read to retrieve a 12-bit amplitude data word for the frequency line corresponding to the sample. This amplitude data word appears at the data-output terminals of amplitude memory 2094 and is applied to the data-input terminals of a buffer 2112 via a set of data lines 2096. Buffer 2112 has three-state outputs which are governed by the logic level appearing on a signal line 2116.

When the appropriate logic level appears on signal line 2116, buffer 2112 impresses the read amplitude data word onto a set of data lines 2114. The read amplitude data word is thus applied to the remaining input of multiplier/accumulator 2118. Multiplier/accumulator 2118 multiplies these two data words together and applies the resulting product onto a set of data lines 2120. Multiplier/accumulator 2118 can also function as an accumulator and a summer. Its operating mode depends on the logic level applied to the control input of multiplier/accumulator 2118 via a signal line 2119. The product data word appearing on data lines 2120 is fed to one input of a latch 2122, as well as to the accumulator input of multiplier/accumulator 2118.

So far, it has been implied that the frequency lines generated by line generator 2000 are monotonic, that is, pure cosine waves. In actuality, line generator 2000 can generate eight frequency lines which are not single frequencies, but rather 100-Hertz-wide frequency bands. This is made possible by modulating the products of the data words read from amplitude memory 2094 and cosine PROM 2098 by a digital noise signal. This digital noise signal is supplied via a set of data lines 2102 to a latch 2104. Latch 2104 loads a digital noise word each time a clock pulse appears on a signal line 2110. Latch 2104 presents the loaded digital noise word at its data-output terminals when the three-state output stages of latch 2104 are enabled by means of an appropriate logic level appearing on a signal line 2108.

When this enablement occurs (with reference to FIG. 2B), the latched digital 12-bit noise word is applied to one input of multiplier/accumulator 2118 via a set of data lines 2106 and data lines 2114. Note that both latch 2104 and buffer 2112 have three-state outputs. Accordingly, both stages can alternately feed a single input of multiplier/accumulator 2118 without mutual interference. The noise data word applied to multiplier/accumulator 2118 is multiplied with the product word previously generated and stored in the accumulator section of the multiplier/accumulator 2118.

If noise modulation of one or more of the frequency lines is not desired, digital data bits describing a constant value can be applied to latch 2104 by data lines 2102.

The resulting digital data word so generated is applied to the data-input terminals of a latch 2122 by way of data lines 2120. Latch 2122 stores this word when it receives a clock pulse via a signal line 2130 and presents it at its data-output terminals when the appropriate logic level is applied to its output-enable input by a signal line 2126. The latched data word is applied to one input of a summer 2132 via a set of data lines 2124. Note that the contents of latch 2122 can be cleared by the application of a pulse to the CLEAR input of latch 2122 by a signal line 2128. Latch 2122 is cleared in this manner before the generation of a sample of the first frequency line in each group of eight frequency lines.

Summer 2132 and two latches 2136 and 2146 act together to sum groups of eight sample words for the eight lines that line generator 2000 can generate. At the beginning of the time interval during which eight frequency-line samples are to be generated, the contents of latches 2122, 2136 and 2146 are reset to zero by means of pulses applied to their CLEAR inputs via signal lines 2128, 2142 and 2152, respectively.

The sample for the first frequency line then appears at the input of latch 2122. This sample word is latched into latch 2122 and is then presented to one input of summer 2132. Latch 2146, whose contents have been reset to zero, presents logic 0's to the remaining input of summer 2132. Summer 2132 generates a sum word that is equal to the output of latch 2122 and presents it to latch 2136. Latch 2136 loads this word upon receipt of a clock pulse via a signal line 2144. The three-state outputs of latch 2136 are then enabled via the application of an appropriate logic level to the output-enable terminal of latch 2136 via a signal line 2140.

The data word stored in latch 2136 is then applied to the data input of latch 2146 via a set of data lines 2138. Data lines 2138 also present this data word to the data-input terminals of a buffer 2156, which functions as an output buffer. Buffer 2156 has three-state outputs which are controlled by the logic level applied to the output-enable input of buffer 2156 via a signal line 2160. However, the outputs of buffer 2156 are maintained in their high-impedance state until later.

Latch 2146 loads the data word when a clock pulse is applied to the CLOCK input of latch 2146 via a signal line 2154. When latch 2122 has been loaded with the sample word corresponding to the second frequency line, the three-state outputs of latch 2146 are enabled by the application of a suitable logic level to the output-enable input of latch 2146 by a signal line 2150. The contents of latch 2146, which correspond to the sample word generated for the first frequency line, are then applied to summer 2132, as are the contents of latch 2122, the sample word generated for the second frequency line. Summer 2132 then generates an output equal to the sum of the sample words for the first two frequency lines. The resulting sum is applied to the data-input terminals of latch 2136.

This sum word is loaded into latch 2136 and then into latch 2146, thus replacing the sum word previously stored in them. Latch 2146 then presents this new sum word to summer 2132, which generates a sum of it and the sample word for the third frequency line. This process continues until the sample word for the eighth frequency line has been generated and summed with the contents of latch 2146, which is the sum of the sample words of the first seven frequency lines. When summer 2132 has generated a sum word containing contributions from each of eight sample words, latch 2136 stores this word and presents it to the data-input terminals of buffer 2156. (Note that this data word is not loaded into latch 2146.) The three-state outputs of buffer 2156 are then enabled. The summed, composite sample output then appears on a final set of data lines 2158. The contents of latches 2122, 2136 and 2146 are then cleared and the three-state outputs of buffer 2156 are disabled. Line generator 2000 can then begin the process of generating the next composite, summed sample word.

Buffer 2156 and data lines 2158 function as a port for presenting the composite, summed sample words thus generated. The use of buffer 2156 having three-state outputs enables several different line generators to feed a common output bus. This capability is employed to advantage in the disclosed system of the present invention, in which five line generators sequentially impress output words onto a common bus 4002.

The discussion so far has assumed that line generator 2000 is generating composite outputs for one single channel. In the disclosed embodiment, there are 36 output channels (output channels 1040). Therefore, line generator 2000 performs the process just described 36 times during each sample period ($1/f_s$).

2. The Noise Generator

The other basic type of signal generator employed in the present invention is a noise generator. FIG. 3 (made up of FIGS. 3A and 3B) is a block diagram of the noise generator, designated generally by reference numeral 3000. Noise generator 3000 functions in a manner similar to that of the Digitally Shaped Noise Generating System disclosed by U.S. Pat. No. 4,125,898 to DeHart and Ridgell, Jr., assigned to the asignee of this application, and whose teachings are incorporated by reference herein.

Referring specifically to FIG. 3A, the heart of noise generator 3000 is a pseudorandom binary number generator 3070, which employs a recirculating shift register to generate a continuous sequence of single binary bits having randomly distributed amplitudes. The generation of digital noise by means of recirculating shift registers is well known in the art.

Pseudorandom binary number generator 3070 in present embodiment generates noise bits (also called pseudorandom binary numbers) at a sampling rate of, for example, approximately 1.8 MegaHertz. This sampling rate is determined by a timebase or timing signal provided by a timing-and-control-logic stage 3044, which receives a master clock signal from an external source, for example, in the hardware controller 1030, via a signal line 3042. Timing-and-control logic 3044 performs several functions, one of which is to provide pseudorandom binary number generator 3070 with the timebase signal it requires via its CLOCK input and a signal line 3074. For the sake of simplicity, connections between signal lines carrying clock or timing signals (such as signal line 3074) and timing-and-control logic 3044 are not shown. Note that the output of pseudorandom binary number generator 3070 is the digital equivalent of white noise.

This noise signal is applied to the data-input terminals of a latch 3076 and to the data-input terminals of a 1- to 8-line decoder 3084. Latch 3076 loads digital noise from a data line 3072 whenever a pulse is applied to its CLOCK input by a signal line 3082. Latch 3076 performs an additional function in that it converts serial noise bits provided to it by pseudorandom binary number generator 3070 into 12-bit digital words. The clock pulses applied to latch 3076 have a duration and repetition rate such that the effective sample rate of the 12-bit noise words which it assembles equals the sample rate of the line generators 2000 employed in the disclosed system 100. Latch 3076 has three-state outputs which are enabled by the application of an appropriate logic level to the output-enable input of latch 3076 via a signal line 3080. When the three-state outputs of latch 3076 are enabled, the digital noise word assembled by and stored in latch 3076 is supplied to a set of data lines 3078.

The noise words which appear on data lines 3078 constitute a random-number output (shown generally at reference numeral 3000R) of noise generator 3000. Random-number output 3000R is made up of twelve data bits. Note that the value of random-number output 3000R changes much more slowly than the noise output of pseudorandom binary number generator 3070. This will be discussed later.

Decoder 3084 acts as a demultiplexer which derives eight separate and uncorrelated digital noise signals from the single noise output of pseudorandom binary number generator 3070. Decoder 3084 accepts samples of digital noise from data line 3072 and sequentially routes successive noise samples to its eight outputs, which are connected to eight sets of data lines shown generally at 3086A through 3086H. Decoder 3084 performs this process under the control of clock pulses applied to its CLOCK input via a signal line 3088. The clock pulses applied to decoder 3084 are such that each output 3086A through 3086H has an effective sampling rate of, for example, 6,553.6 Hertz, as is the case with random-number output 3000R. This sampling and demultiplexing process is performed by decoder 3084 at a rate which insures that the digital noise signals impressed upon data lines 3086A through 3086H bear no significant correlation to each other.

Having pseudorandom binary number generator 3070 clock at a sample rate which is much higher than the effective sample rate of the digital noise signals which appear at output 3000R and on data lines 3086A through 3086H realizes an economy in that nine separate noise sources are not required. Rather, a single, quickly-changing noise output is processed so that nine uncorrelated and more slow-changing digital noise signals are derived from it.

The digital noise signals appearing at the outputs of decoder 3084 are each applied to the NOISE input of one of a set of eight digital filters 3102A through 3102H via data lines 3086A through 3086H. The eight digital filters 3102A through 3102H are identical to each other, as are the other signal-processing stages, data lines, and signal lines which have the same numerals in their reference designations, but which have different letter suffixes. In order to simplify the discussion of the remainder of the embodiment of line generator 3000, only one of these signal-processing channels (that whose components have the letter suffix A) will be discussed. Note that each signal-processing channel acts in the same way upon the output of decoder 3084 which is applied to it.

Digital filter 3102A is the standard finite-impulse-response type well known in the art. Digital filter 3102A convolves the digital noise signal (also called pseudorandom binary numbers) applied to its noise input via data line 3086A with a digitized version of the time-domain (impulse) response of a desired filter function. Digital data (also called impulse-response data words) describing the desired finite impulse response of each of the digital filters 3102A through 3102H are supplied by a filter-coefficient memory 3062. These data can also be termed frequency-response data because they determine the frequency response of digital filters 3102A through 3102H.

Filter-coefficient memory 3062 is loaded with frequency-response data in the following manner. An address word is applied to the data-input terminals of a latch 3002 via a set of data lines 3001. Latch 3002 loads this address word when a clock signal is supplied to it by a signal line 3008. Latch 3002 has three-state outputs which are enabled by the application of an appropriate logic level to the output-enable input of latch 3002 by a signal line 3006. When the three-state outputs of latch 3002 are enabled, the address word appears on a set of data lines 3004. This address word is loaded into a latch 3010 by a set of data lines 3004 when a clock pulse is applied to latch 3010 by a signal line 3014.

Latch 3010 has three-state outputs which are enabled by the application of an appropriate logic level to the output-enable input of latch 3010 by a signal line 3016. When the three-state outputs of latch 3010 are enabled, the address word is applied to the address input of filter-coefficient memory 3062 by two sets of data lines 3012 and 3056, respectively. Note that data lines 3056 are also connected to the data-output terminals of a latch 3054, which also has three-state outputs. The three-state outputs of latch 3054 are maintained in their high-impedance state when the three-state outputs of latch 3010 are enabled, and vice versa.

Note that this address word is supplied to the address inputs of filter-coefficient memory 3062 while a corresponding frequency-response data word is loaded into latch 3002 and then into latch 3018. Latch 3018 has three-state outputs which are enabled by the application of the appropriate logic level to a signal line 3024. When the three-state outputs of latch 3018 are enabled, the frequency-response data word loaded into latch 3018 is applied to the data-input terminals of filter-coefficient memory 3062 by a set of data lines 3020. Thus, one frequency-response data word is loaded into a memory location of filter-coefficient memory 3062 corresponding to the address supplied by latch 3010. This process continues until all of the frequency-response data words required by digital filters 3102A through 3102H have been loaded into filter-coefficient memory 3062.

Note also latches 3026 and 3034, whose data-input terminals are also connected to data lines 3004. Latches 3026 and 3034 provide address and amplitude data words, respectively, to an amplitude memory 3066. The function of amplitude memory 3066 is discussed later. However, it is appropriate here to note that amplitude memory 3066 is loaded with amplitude data words by latches 3002, 3026, and 3034 in a manner similar to that by which frequency-response data words are loaded into filter-coefficient memory 3062 via latches 3002, 3010, and 3018.

After filter-coefficient memory 3062 has been loaded with all the required frequency-response data words for digital filters 3102A through 3102H, the three-state outputs of latches 3010 and 3018 are placed in their high-impedance state. Then, filter-coefficient memory 3062 is addressed by sequences of address worlds generated by timing and control logic 3044. These address words appear on a set of data lines 3046 and are applied serially to latch 3054. Latch 3054 loads an address word each time a clock pulse is applied to it via a signal line 3060. Latch 3054 has three-state outputs which are enabled by means of the application of an appropriate logic level to the output-enable input of latch 3054 by a signal line 3058.

When the three-state outputs of latch 3054 are enabled, the address word stored in latch 3054 is applied by data lines 3056 to the address inputs of filter-coefficient memory 3062. The frequency-response data word stored in the addressed memory location of filter-coefficient memory 3062 is present on a set of data lines 3064, which supply it to the data-input terminals of a set of eight latches 3090A through 3090H. Assuming that the read frequency-response data word is intended for digital filter 3102A, a pulse is applied by a signal line 3094A to the CLOCK input of latch 3090A. The frequency-response data word is loaded into latch 3090A and is provided to the frequency-data input terminals of digital filter 3102A via a set of data lines 3092A. Timing-and-control logic 3044 thus generates sequences of address words for filter-coefficient memory 3062 and provides clock pulses to latches 3090A through 3090H in the correct sequence so that digital filters 3102A through 3102H receive the finite-impulse-response coefficients they require to implement the desired filter functions.

The filtered-noise output of digital filter 3102A is applied by a set of data lines 3104A to one input of a multiplier 3106A (FIG. 3B). Applied to the remaining input of multiplier 3106A are 12-bit amplitude data stored in amplitude memory 3066. These amplitude data are multiplied by the filtered digital noise from digital filter 3102A in multiplier 3106A so that the shaped-noise output of digital filter 3102A has the desired level.

Amplitude memory 3066 is initially loaded with amplitude data by latches 3002, 3026 and 3034, as was mentioned earlier. When amplitude memory 3066 has been loaded with all the required amplitude data for multipliers 3106A through 3106H, the three-state outputs of latches 3026 and 3034 are placed in their high-impedance state. These latches need not be reactivated until it is time to substitute new amplitude data for those stored in locations of amplitude memory 3066.

Amplitude memory 3066 receives address words from timing and control logic 3044 via a latch 3048, which also has three-state outputs. Latch 3048 loads an address word intended for amplitude memory 3066 when a clock pulse is applied to it via a signal line 3052. Then, the three-state outputs of latch 3048 are enabled by the application of an appropriate logic level by a signal line 3051 to the output-enable input of latch 3048. The address word which appears at the data-output terminals of latch 3048 is supplied to the address input of amplitude memory 3066 by a set of data lines 3050. The amplitude data stored in the addressed location of amplitude memory 3066 appears on a set of data lines 3068, which provide it to the data-input terminals of a set of eight latches 3096A through 3096H.

Assuming that multiplier 3106A is to receive the amplitude data word read from amplitude memory 3066, a clock pulse is applied to latch 3096A by a signal line 3100A. Latch 3096A loads this amplitude data word and provides it by a set of data lines 3098A to the remaining input of multiplier 3106A.

As was the case with filter-coefficient memory 3062, amplitude memory 3066 is addressed by a sequence of address words so that each multiplier 3106A through 3106H receives appropriate data words which describe the desired amplitude of the shaped-noise output which is to be generated for the particular signal-processing channel. The 12-bit product words generated by multipliers 3106A through 3106H are each applied to the data-input terminals of the associated one of a set of eight buffers 3110A through 3110H via eight sets of data lines 3108A through 3108H. Buffers 3110A through 3110H have three-state outputs which are enabled by the application of appropriate logic levels to their output-enable inputs via a set of eight signal lines 3114A through 3114H.

When the three-state outputs of a particular buffer 3110A through 3110H are enabled, the product word currently appearing at the output of the associated multiplier 3106A through 3106H appears on the corresponding one of eight sets of data lines 3112A through 3112H. Thus, appearing on the sets of data lines 3112A through 3112H are eight distinct noise signals having preselected amplitude scaling and frequency-distribution shaping. The eight shaped-noise outputs of noise generator 3000 are shown generally at 3000A through 3000H. The fact that buffers 3110A through 3110H have three-state outputs permits the application of two or more of shaped-noise outputs 3000A through 3000H to a common data bus in multiplexed fashion. This capability is employed in the underwater background-acoustics synthesis system 100 disclosed herein.

It should be understood that an alternate embodiment (not shown) can employ a single digital filter 3102 in lieu of eight separate digital filters 3102A to 3102H. This filter 3102 would function on a multiplexed basis to filter separately noise samples provided sequentially by data lines 3086A through 3086H. Also, the single digital filter 3102 could include sufficient data storage capability to obviate the need for filter coefficient memory 3062.

D. Detailed System Description

Having described the two fundamental types of signal generators employed in system 100 of the present invention, a more detailed system description will now be presented. Refer now to FIG. 4, which is a more detailed functional-block diagram of underwater background acoustics synthesis system 100. A single noise generator 3000 and five line generators 4000, 4010, 4028, 4034, and 4052 are employed.

As was the case with the more general description of system 100 of FIG. 1, microcomputer 1010 oversees the synthesis of underwater background acoustics signals employed in the simulated episode. As already noted and referring to FIG. 4A, microcomputer 1010 communicates with simulation computer 1000 via bidirectional data buses 1002 and 1022 and interface 1004, and communicates with hardware controller 1030 via bidirectional data buses 1022 and 1028 and interface 1004. Output bit sequences (third data signals) from hardware controller 1030 are applied to the signalsynthesis and processing section of system 100 by main controller bus 1032. It should also be noted that microcomputer 1010 can communicate directly with line generators 4000 and 4010 via hardware controller 1030 and main controller bus 1032. However, note that microcomputer 1010 cannot communicate directly with line generators 4028, 4034 and 4052. Rather, line generators 4028, 4034 and 4052 receive instructions and data from associated controller stages. Line generator 4028 (which generates porpoise signals) and line generator 4034 (which generates whale signals) each receive instructions from a porpoise-and-whale controller 4016. Similarly, line generator 4052, which generates hydrophone-gurgle signals, receives data and control signals from a gurgle controller 4040. Line generator 4000, under the direct control of hardware controller 1030, generates frequency lines which are employed in the synthesis of hung-hydrophone sounds. Line generator 4010, also under the direct control of hardware controller 1030, generates frequency lines which form the synthesized hydraulics component of the submarine-transients signal.

Whether a line generator receives instructions from hardware controller 1030 directly or from an appropriate controller stage depends upon the nature of the underwater background acoustics signal that the given line generator is dedicated to synthesizing. For example, if the dynamic parameters of a sound need not be updated very often, direct control of the line generator by microcomputer 1010 via hardware controller 1030 and main controller bus 1032 is feasible. This is called "software control" because the data provided to that line generator originate in the operating program according to which microcomputer 1010 functions.

Some synthesized background sounds, however, are more dynamic in nature. Consequently, the line generators dedicated to synthesizing them must receive data that are updated very often. These data must be updated so frequently that software control of the associated line generators is not feasible.

This situation is analogous to that discussed above in defining the roles of simulation computer 1000 and microcomputer 1010. If microcomputer 1010 had to provide frequency and amplitude data to line generators 4020, 4034 and 4052 in real time, microcomputer 1010 would have to run at a considerably greater speed, and its operating program would have to be more complex. To reduce such demands on microcomputer 1010, frequency and amplitude data for line generators 4028, 4034 and 4052 are generated by hardware within the controllers associated with these line generators. Therefore, with respect to the synthesis of the porpoise-and-whale and hydrophone-gurgle signals, microcomputer 1010 performs only an indirect supervisory function. This approach is called herein "hardware control".

Note that noise generator 3000 receives amplitude and frequency-response data for the eight shaped-noise outputs 3000A through 3000H directly from microcomputer 1010 via hardware controller 1030 and main controller bus 1032, and not from any dedicated controller. Thus, generation of the shaped-noise outputs 3000A through 3000H is performed under software control. However, these noise outputs must be further processed by hardware control because they change fairly rapidly. The further processing involves imparting time-varying amplitudes (envelopes) to the shaped-noise outputs which correspond to the dynamic characteristics of underwater background sounds or sound components. (Some underwater background sounds are composed entirely of shaped, amplitude-modulated noise; others have both noise and frequency-line components; and still others have only frequency-line components.) So, for example, a snapping-shrimp controller 4058 receives instructions from microcomputer 1010 via hardware controller 1030 and main controller bus 1032. Snapping-shrimp controller 4058 generates amplitude (envelope) data which are combined with a shaped-noise output of noise generator 3000 under software control in a multiplier/accumulator 4068. Also, a hydrophone-lowering controller 4064 generates amplitude data which are combined with shaped noise from noise generator 3000 in multiplier/accumulator 4068.

It should be understood that the stages having the reference numbers 3000, 4000, 4010, 4016, 4028, 4034 and 4052 are the essential signal-generating stages of system 100. Noise generator 3000, as mentioned earlier, has several outputs. Random-number output 3000R is also supplied by a set of data lines 4044 to input terminals of gurgle controller 4040. Shaped-noise outputs 3000A, 3000B, and 3000C are applied to the inputs of a noise controller 4022. Noise controller 4022 has three outputs, W0, W1, and W2. W0 is a constant-amplitude data word which is applied to the noise inputs of line generators 4000 (dedicated to generating frequency lines for the hung-hydrophone signal), 4028 (dedicated to generating frequency lines for porpoise signals), and 4034 (dedicated to generating frequency lines for whale signals). The sounds with which these line generators are associated require frequency lines which are pure sinusoids.

Outputs W1 and W2 are noise signals having 50-Hertz bandwidths which are derived from appropriate outputs of noise generator 3000 by a simple latching process. Output W1 is applied to the noise input of line generator 4010 (dedicated to generating frequency lines for the hydraulics component of the submarine-transients signal) via a set of data lines 4014. Output W2 is applied to the noise input of line generator 4052 (which provides frequency lines for the hydrophone-gurgle signal) via a set of data lines 4056. These noise signals are applied to the respective line generators because the frequency lines required for the synthesis of submarine-transients and hydrophone-gurgle signals are broadband in nature and not monotonic.

Note that each of the line generators 4000, 4010, 4028, 4034 and 4052 correspond to line generator 2000 of FIG. 2. An output of noise controller 4022, which is applied to the noise input of one of these line generators, is multiplied with the amplitude/frequency product word generated by multiplier/accumulator 2118. The multiplication of the composite amplitude/frequency product words by a constant data word (W0) does not alter the spectral characteristics of the frequency lines generated by the line generator in question. However, a 50-Hertz-wide noise signal applied to the input of a line generator results in a double-sideband, suppressed-carrier frequency line which is 100-Hertz-wide and which is centered about the frequency of the cosine signal read from cosine PROM 2098.

The multiplexed nature of system 100 as shown in FIG. 4 is apparent. Note that all of the signal sources and signal-processing stages having reference numbers between 3000 and 4072 feed a single multiplier/accumulator 4080 either directly or ultimately. For example, line generators 4000, 4010, 4028, 4034 and 4052 all feed a common output bus 4002. They can do so because of their three-state outputs, which are controlled by an output-enable controller 4048. Output-enable controller 4048 generates six output-control signals E0 through E5 designated generally by reference numeral 4050. Of these, outputs E0 through E4 are each applied to the output-enable input of one of the five line generators via a signal line dedicated to this purpose. The remaining output E5 controls a buffer 4072, which is discussed below.

The output 3000D of noise generator 3000 is also applied directly to common output bus 4002 via a set of data lines 4008. Outputs 3000E through 3000H are multiplexed onto a noise bus 4026. Noise bus 4026 provides noise signals to both a time-delay circuit 4046 (which generates a component of the hung-hydrophone sound) and to one input of multiplier/accumulator 4068, which processes noise components for the synthesis of the snapping-shrimp, explosion-and-hull-crumple, hydrophone-lowering, and hung-hydrophone signals. Time-delay circuit 4046 has three-state outputs, so multiplier/accumulator 4068 can at any given instant be fed with either undelayed noise signals directly from noise generator 3000 or delayed noise from time-delay circuit 4046 via the single noise bus 4026.

Figure 4B:
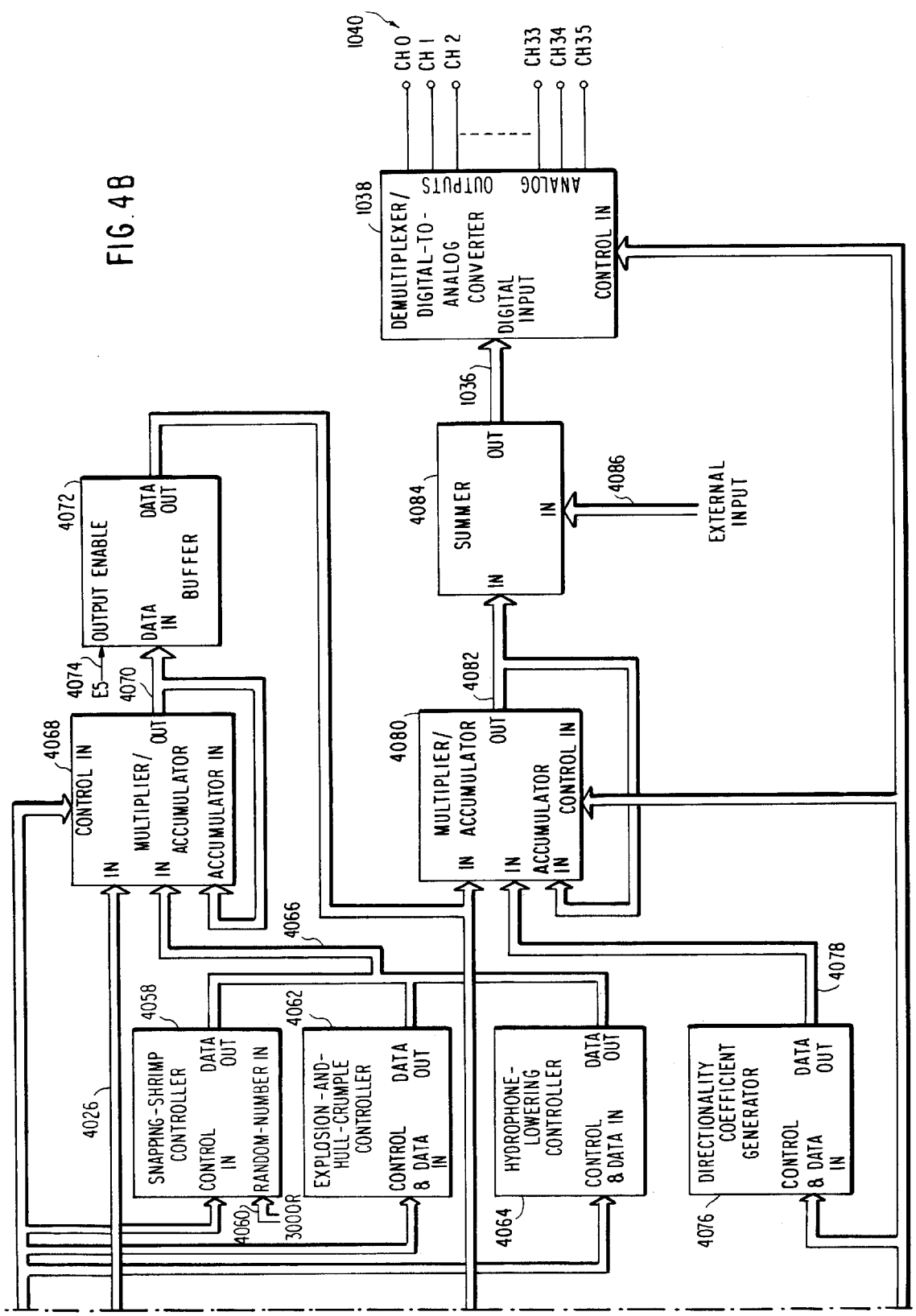
FIG. 4B illustrates in block-diagram form the remaining signal-generating and the output stages of the underwater background acoustics synthesizer system of the present invention.

Multiplier/accumulator 4068, as shown in FIG. 4B, impresses amplitude (envelope) data on shaped noise signals, and also functions as a summer which adds delayed and undelayed noise. This is done in the generation of a component of the hung-hydrophone signal. The output of multiplier/accumulator 4068 is impressed upon common output bus 4002 via a set of data lines 4070 and a buffer 4072, which has three-state outputs. The outputs of buffer 4072 are controlled by output E5 of output-enable controller 4048, which is applied to the output-enable input of buffer 4072 via a signal line 4074.

Multiplier/accumulator 4080 serially processes samples of each of the signals synthesized by system 100 of the present invention. It imparts directional characteristics to these samples by multiplying them with North/South-, East/West-, and omnidirectional-amplitude data words. These directionality-coefficient data words are provided to an input of multiplier/accumulator 4080 by a directional-coefficient generator 4076 by a set of data lines 4078. Directional-coefficient generator 4076 accepts control and amplitude-data words from hardware controller 1030 via main control bus 1032. Directional-coefficient generator 4076 stores these amplitude data words and provides them to multiplier/accumulator 4080 in a sequence dictated by hardware controller 1030.

Multiplier/accumulator 4080, like multiplier/accumulator 4068, can function as a multiplier, accumulator or summer. Its operation is governed by hardware controller 1030 by means of control words supplied to its control input via main control bus 1032. The output of multiplier/accumulator 4080 is provided to one input of a summer 4084 via a set of data lines 4082. Summer 4084 functions as a port at which digitally synthesized signals from other sources can be supplied to system 100 by a set of data lines 4086. The output (fourth digital signals) of summer 4084 is applied by the set of data lines 1036 to demultiplexer/digital-to-analog converter 1038. It should be understood that the signals present on data lines 1036 can be supplied to other, external signal processing stages.

The function of demultiplexer/digital-to-analog converter 1038 was discussed above with reference to FIG. 1. Converter 1038 assembles the samples of the synthesized acoustic signals provided to it on a per-channel basis and converts them into analog signals which appear at its, for example, 36 outputs (also called analog output channels) 1040. As is typical in digital-to-analog conversion, demultiplexer/digital-to-analog converter 1038 includes an analog, alias-suppression filter.

DETAILED DESCRIPTION OF THE SYNTHESIS OF SPECIFIC SOUNDS

Having discussed above the operation of system 100 broadly and the operation of line generator 2000 and noise generator 3000 in detail, the detailed description will now focus on the specific sounds synthesized by system 100 of the present invention and the ways in which each is synthesized. The rest of the detailed description is presented on a sound-by-sound basis.

B. Hydrophone Lowering

The hydrophone-lowering sound, which occurs when a hydrophone is lowered into the water from its sonobuoy housing, as synthesized comprises two components. The inventors have observed that the sonobuoy mechanism which lowers the hydrophone into the water produces a low-frequency noise. In addition, the displacement of water by the hydrophone as it is lowered to the desired depth results in the generation of a higher-frequency noise. FIG. 5A plots the spectral signature of the composite hydrophone-lowering sounds, where the horizontal axis is frequency in Hertz and the vertical axis is amplitude in dB. It should be understood that the lowest frequency at which the higher-frequency noise can have energy components can vary from 200 to 600 Hertz. Also, the low-frequency noise has no significant spectral components above approximately 800 Hertz. FIG. 5B plots the envelopes imparted to the hydrophone-lowering sound components, where the horizontal axis is time in milliseconds and the vertical axis is amplitude in dB. Note that the signal components have envelopes of random pulsation.

To synthesize this sound, noise generator 3000 receives two sets of frequency-shaping data from microcomputer 1010 (see FIG. 4) and applies them to two of its internal, digital convolution filters. The noise signals shaped by the appropriate two filters (that is, high-pass-filtered digital noise words and low-pass-filtered digital noise words) appear at two of the four outputs 3000E, 3000F, 3000G and 3000H and are serially applied to one input of multiplier/accumulator 4068 via noise bus 4026.

Amplitude data for the two hydrophone-lowering noise components (denominated random amplitude data words) are provided to multiplier/accumulator 4068 by hydrophone-lowering controller 4064, which receives them and control signals from microcomputer 1010 via bidirectional bus 1032. Hydrophone-lowering controller 4064 provides amplitude data words for both noise signals to multiplier/accumulator 4068 at a rate T, where T is between approximately 10.0 and 25.0 milliseconds. A preferred value for T is 20 milliseconds, which is used for illustrative purposes in the embodiment further described. These data words, which impart random pulsation to the noise words, have approximate values randomly selected from the values which appear in Table 1 as follows:

TABLE 1

|  | High-Frequency Noise (AMPI$_1$) | Low-Frequency Noise (AMPI$_2$) |
| --- | --- | --- |
| Amplitudes* | 103.7 dB | 105.0 dB |
|  | 105.0 dB | 108.2 dB |
|  | 106.3 dB | 109.8 dB |
|  | 108.2 dB | 111.7 dB |

*Referenced to the maximum possible signal amplitude of 120 dB.

The initial amplitudes of the high- and low-frequency noise components, AMPI$_1$ and AMPI$_2$, respectively, which are attained for the first T milliseconds (for example, 20 milliseconds) of each sound sequence, are listed above. The steady-state amplitudes, AMP$_1$ and AMP$_2$, are 6 or 9.6 dB less, with equal probability, than the values listed above. Referring again to FIG. 5B, it is apparent that the hydrophone-lowering sound envelope has a pulsating characteristic. The number of pulses in a sound sequence is a random variable (PNUM), as are the time between leading edges (PW) and the ON time of each pulse (PDUR). In the preferred embodiment as implemented in FIG. 7 discussed later, the first pules of PNUM has values of AMPI$_N$ which are 9.6 dB greater than the values of AMP$_N$. If PNUM is greater than 1, the subsequent pulses in the PNUM sequence have values of AMP$_N$ equal to those of the first pulse, but have values of AMPI$_N$ which are 6 or 9.6 dB greater, with equal probability, than the values of AMP$_N$. The approximate values of PNUM, PW, PDUR are listed in Table 2 as follows:

TABLE 2

| Time Durations* | PW | PDUR |
| --- | --- | --- |
|  | 120 | PW-20 |
|  | 140 | PW-40 |
|  | 180 | PW-60 |
|  | 200 | PW-80 |
| Number of Pulses |  | PNUM |
|  |  | 1 |
|  |  | 2 |
|  |  | 3 |
|  |  | 4 |

*in milliseconds

Note that PW is between approximately 100 to 200 milliseconds, and is an integral multiple of T. Further, PDUR=PW−nT, where n has integer values from 1 to 4. It should be underderstood that for any given value of PW, PDUR will have (with equal probability) one of the four values calculated from the preceding equation.

Referring again to FIG. 4, the hydrophone-lowering signal comprises first product words produced by multiplying the high-pass filtered digital noise words and the first random amplitude data words, and second product words produced by multiplying the low-pass filtered digital noise words and the second random amplitude data words). These product words are produced by multiplier/accumulator 4068 and then summed. The sum is impressed by buffer 4072 onto output bus 4002. The signal is combined with directional information from directionality coefficient generator 4076 by multiplier/accumulator 4080, and is then passed to demultiplexer/digital-to-analog converter 1038 via data lines 4082, summer 4084 and data lines 1036.

Figure 6:
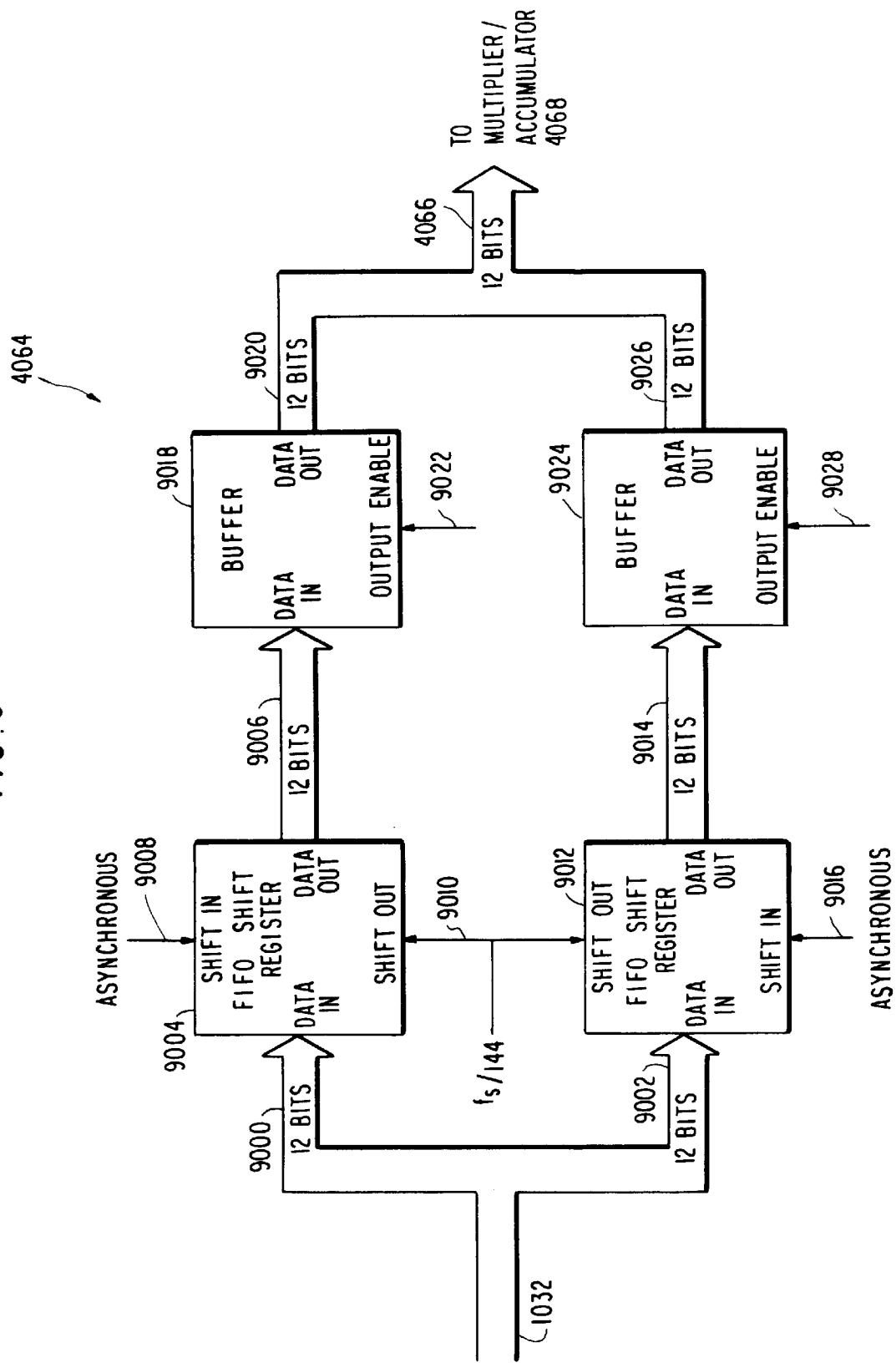
FIG. 6. illustrates in block-diagram form the hydrophone-lowering controller employed in the system of the present invention.

Hydrophone-lowering controller 4064 is shown in more detail in the block diagram of FIG. 6. Control of the generation of the hydrophone-lowering sound is a hybrid of hardware and software control. The parameters (signal-component amplitudes) are not stored in a memory in hydrophone-lowering controller 4064. Rather, they are supplied and updated by microcomputer 1010 dynamically. However, hydrophone-lowering controller 4064 is structured to reduce the amount of time which microcomputer 1010 must spend with regard to the generation of the hydrophone-lowering sounds.

Hydrophone-lowering controller 4064 comprises two first-in/first-out (FIFO) shift registers 9004 and 9012 and two associated buffers 9018 and 9024. Shift registers 9004 and 9012 at their DATA IN ports receive bursts of amplitude data bits from microcomputer 1010 via hardware controller 1030 and bus 1032. Together registers 9004 and 9012 make up a storing stage. The program will cycle at a program rate of between 1 and 20 cycles per second, and with a program period equal to the reciprocal of the program rate. The number of data words which must be generated per program cycle is equal to 2/((T)/(program period)).

Assuming for the following embodiment that the program rate is 5 cycles per second, in 200 milliseconds, twenty 12-bit amplitude data words are loaded into shift registers 9004 and 9012. First, 10 amplitude data words describing the lower-frequency noise component of the hydrophone-lowering sound are loaded into shift register 9004. Then, ten other amplitude data words for the higher-frequency noise component of the hydrophone-lowering sound are loaded into shift register 9012. These data words are loaded asynchronously when shift registers 9004 and 9012 receive pulses from microcomputer 1010 via hardware controller 1030, bus 1032 and a pair of signal lines 9008 and 9016. The amplitude-data words are applied to the data-input terminals of shift registers 9004 and 9012 via two sets of data lines 9000 and 9002, which branch from bus 1032.

Data words are clocked out of shift registers 9004 and 9012 by means of $f_s/144$ clock pulses applied to the shift-out terminals of the registers via a signal line 9010. The data words clocked out of shift registers 9004 and 9012 are applied to the data-input terminals of a pair of buffers 9018 and 9024 via two sets of data lines 9006 and 9014. Buffer 9018 is denominated a first presenting stage, and buffer 9024 is denominated a second presenting stage. The output-enable terminals of buffers 9018 and 9024 receive pulses having durations of $1/(1152f_s)$ and repetition rates of $36f_s$ via a pair of signal lines 9022 and 9028. Note that the three-state outputs of buffers 9018 and 9024 are not enabled simultaneously, and are enabled more often than data words are shifted out of registers 9004 and 9012. This operation is so because the amplitudes of the hydrophone-lowering signal components need not be updated so quickly. The data words which appear at the data-output terminals of buffers 9018 and 9024 are impressed upon controller-output bus 4066 via two sets of data lines 9020 and 9026 for application to multiplier/accumulator 4068.

Hydrophone-lowering controller 4064 takes a large portion of the burden of controlling the generation of hydrophone-lowering sounds from microcomputer 1010 by receiving amplitude data in a bursty, asynchronous fashion.

The received data are then clocked out at a slower, synchronous pace for application to multiplier/accumulator 4068. Thus, microcomputer 1010 need only generate amplitude data words much less often as it would have to in the absence of hydrophone-lowering controller 4064.

Figures 7, 7A:
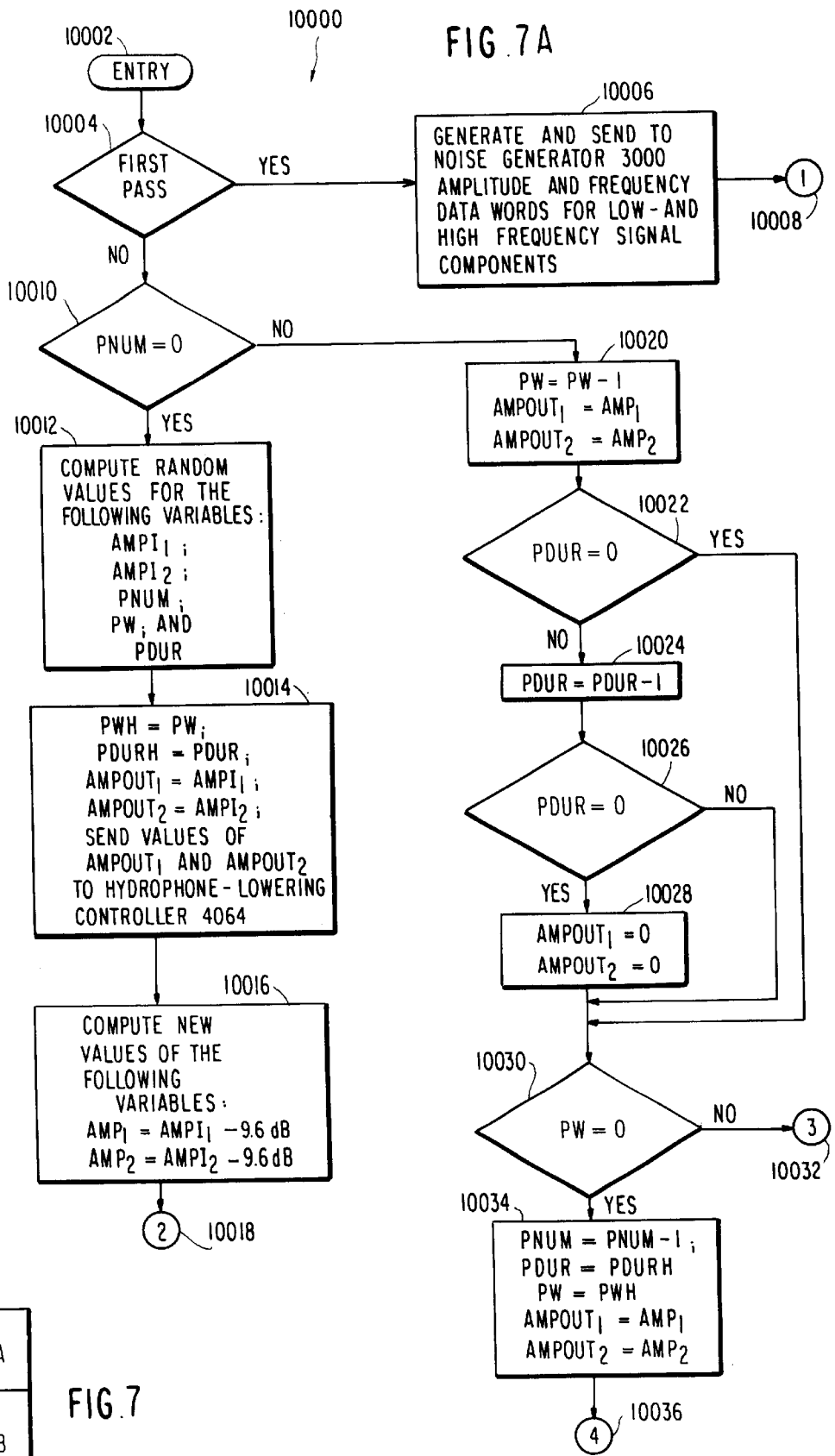
FIG. 7 illustrates diagrammatically the relationship between FIGS. 7A and 7B.
FIGS. 7A and 7B together illustrated in rate flow-chart form the software routine implemented by the microcomputer synthesis of hydrophone-lowering sounds.
Figure 7B:
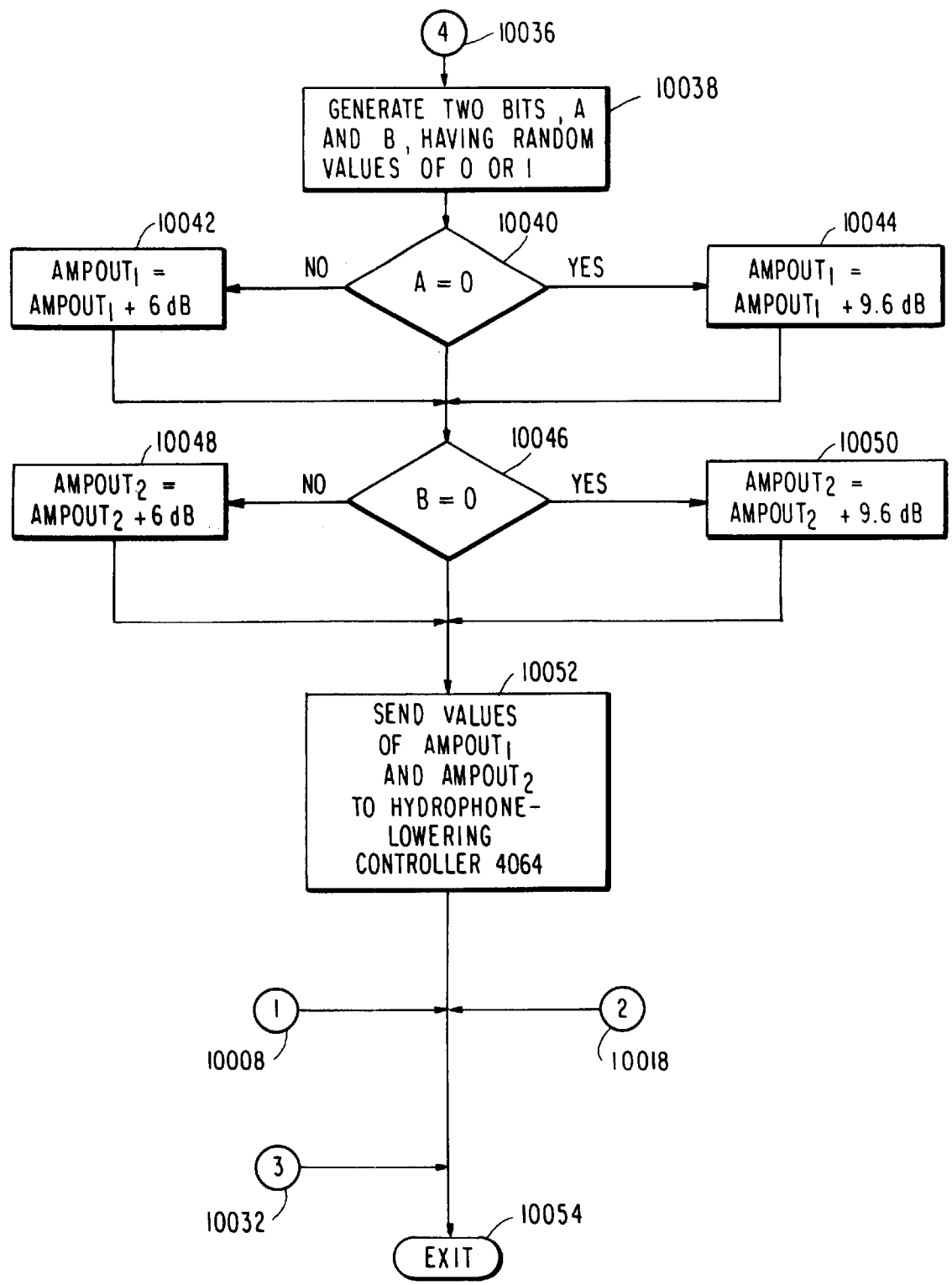

A flow chart describing the software routine which microcomputer 1010 implements to control the synthesis of the hydrophone-lowering sound is shown in FIGS. 7A–7B.

The hydrophone-lowering software routine, which is designated generally by reference numeral 10000, is implemented in this example 10 times every 200 milliseconds. The hydrophone-lowering sound is the same for each channel, so routine 10000 need not be performed separately for each of the 36 channels 1040. Routine 10000 begins with an entry step 10002. Next, a decision step 10004 is performed in which it is determined whether this is the first pass that microcomputer 1010 has made through routine 10000. If it is the first pass, a YES decision is reached and an operation step 10006 is performed. Here, microcomputer 1010 is instructed to generate and send to noise generator 3000 amplitude and frequency-response data words for the low- and high-frequency components of the hydrophone-lowering sound. After operation step 10006 is performed, routine 10000 is exited via continuation label 10008 and exit step 10054.

If it is not the first pass of routine 10000 by microcomputer 1010, a NO decision is reached in decision step 10004, and a decision step 10010 is performed. Here, one of the random variables which is generated in software to effect the synthesis of the hydrophone-lowering sound, PNUM, is evaluated as to its value. If the value of PNUM is 0, a YES decision is reached and it is time to randomize the variables associated with the synthesis of the hydrophone-lowering sound. This is done by proceeding to an operation step 10012, in which random values for the following variables are computed: $AMPI_1$; $AMPI_2$; PNUM; PW; and PDUR. $AMPI_1$ is the initial amplitude of the low-frequency noise component; $AMPI_2$ is the initial amplitude of the high-frequency noise component. The values which these variables can have were given earlier. PNUM is the number of pulses in a sound sequence and is illustrated in FIG. 5B. PW and PDUR were also defined earlier and are shown graphically in FIG. 5B. For the remainder of this section of the specification, PW will be considered to be capable of having the values 5, 7, 9 and 10. These values should be multiplied by a factor of T milliseconds to correspond with those shown in Table 2. Similarly, PDUR can have values of PW minus 1, 2, 3 or 4, and should be multiplied by a factor of T milliseconds to correspond with the values listed in Table 2.

After operation step 10012 has been performed, an operation step 10014 is performed. Here, a variable PWH is set equal to PW and is held in a buffer in microcomputer 1010. A variable PDURH is set equal to PDUR and is stored in another buffer. Another variable $AMPOUT_1$ is set equal to $AMPI_1$, and a variable $AMPOUT_2$ is set equal to $AMPI_2$. The values of $AMPOUT_1$ and $AMPOUT_2$ are sent to hydrophone-lowering controller 4064 before operation step 10014 is completed. Thus, hydrophone lowering controller 4064 is provided with initial amplitude data.

After operation step 10014 has been completed, an operation step 10016 is performed to generate values for the steady-state amplitudes $AMP_1$ and $AMP_2$. This is done by reducing the values of the variables $AMPI_1$ and $AMPI_2$ by 9.6 dB (a factor of 3). Next, routine 10000 proceeds through a continuation label 10018 to exit step 10054.

If PNUM is found to be not equal to 0 in decision step 10010, a NO decision is made and routine 10000 proceeds to an operation step 10020. Here, the value of variable PW is decremented by a factor of 1, and $AMPOUT_1$ is set equal to $AMP_1$. Similarly, $AMPOUT_2$ is set equal to $AMP_2$. Next, a decision step 10022 is performed to determine if PDUR is equal to 0. If this variable has a value of 0, a YES decision is reached and routine 10000 proceeds to a decision step 10030. A YES result is reached when a hydrophone-lowering pulse has decreased to minimum amplitude.

If PDUR has a value other than 0, a NO decision is reached and an operation step 10024 is performed to decrement the value of PDUR by a factor of 1. This operation step reduces the remaining ON time of the pulse in progress. After operation step 10024 has been performed, a decision step 10026 is performed. Again, the value of PDUR is evaluated. If PDUR does not equal zero, routine 10000 proceeds to decision step 10030. If PDUR has a value of 0, a YES decision is reached, and an operation step 10028 is performed to set $AMPOUT_1$ and $AMPOUT_2$ equal to 0. After operation step 10028 is performed, decision step 10030 is reached.

In decision step 10030, the value of PW is evaluated. If PW is not equal to 0, routine 10000 proceeds via continuation label 10032 to exit step 10054. If PW has a value equal to 0, it is time to start a new pulse. This is done by means of operation step 10034, in which the number of remaining pulses to be generated is reduced by a factor of 1 (PNUM is set equal to PNUM-1), the values of variables PDUR and PW are reset so that they equal the stored values PDURH and PWH, respectively, and the values of $AMPOUT_1$ and $AMPOUT_2$ are set equal to $AMP_1$ and $AMP_2$, respectively. Routine 10000 then proceeds via a continuation label 10036 to an operation step 10038.

In operation step 10038, two bits A and B, having random binary values, are generated by microcomputer 1010. After this is done, a decision step 10040 is performed to evaluate bit A. If bit A has a value of 0, a YES decision is reached in decision step 10040, and an operation step 10044 is performed to increase the value of $AMPOUT_1$ by a factor of 9.6 dB. If bit A has a value of 1, a NO decision is reached in decision step 10040, and an operation step 10042 is performed to increase the value of $AMPOUT_1$ by a factor of 6 dB. After the value of $AMPOUT_1$ has been increased by means of operation step 10042 or 10044, another decision step 10046 is performed. In operation step 10046, bit B is evaluated.

If bit B has a value of 0, a YES decision is reached in decision step 10046, and an operation step 10050 is performed to increase the value of $AMPOUT_2$ by a factor of 9.6 dB. If bit B has a value of 1, a NO decision is reached in decision step 10046, and an operation step 10048 is performed to increase the value of $AMPOUT_2$ by a factor of 6 dB. After the value $AMPOUT_{2\ has}$ been increased by either operation step 10050 or 10048, an operation step 10052 is performed to send the values of $AMPOUT_1$ and $AMPOUT_2$ to hydrophone-lowering controller 4064. The increase in the values of $AMPOUT_1$ and $AMPOUT_2$ on a random basis by operation steps 10038, decision step 10040, operation step 10042 or 10044, decision step 10046, and operation step 10048 or 10050 is done to generate the initial, higher-level amplitudes $AMPI_1$ and $AMPI_2$. After operation step 10052 has been performed, routine 10000 is exited via exit step 10054.

We claim:

1. A system, comprising:
   (a) first computer means for generating first digital signals including first data signals, first address signals, and first control signals;

(b) second computer means, including a stored program, responsive to said first computer means, for generating second digital signals including second data signals, second address signals, and second control signals in accordance with said first digital signals and said stored program;

(c) hardware-controller means, responsive to said second computer means, for generating third digital signals including third data signals, third address signals, and third control signals in accordance with said second digital signals;

(d) synthesizer means, responsive to said hardware-controller means, for synthesizing fourth digital signals in accordance with said third digital signals, said fourth digital signals comprising samples of digitally synthesized hydrophone-lowering sounds, wherein said synthesizer means comprises hydrophone-lowering means for synthesizing said hydrophone-lowering sounds, (1) first noise generating means for generating high-pass-filtered digital noise words in accordance with said third digital signals, (2) second noise generating means for generating low-pass-filtered digital noise words in accordance with said third digital signals, and (3) summing means for summing said high-pass-filtered digital noise words and said low-pass-filtered digital noise words to provide summed noise words; and (e) output means, responsive to said synthesizer means, for converting said fourth digital signals to analog output signals.

2. The system as defined in claim 1, wherein said high-pass-filtered noise words contains, spectral components distributed upward of from approximately 100 to 600 Hertz.

3. The system as defined in claim 1, wherein said low-pass-filtered noise words contains spectral components distributed below approximately 800 Hertz.

4. The system as defined in claim 1, further comprising random pulse means for imparting a random pulsation envelope to said summed noise words.

5. The system as defined in claim 1, wherein said hydrophone-lowering means further comprises:

(a) random pulse means, responsive to said first and second noise generating means, for imparting random pulsations to said high-pass-filtered digital noise words and said low-pass-filtered digital noise words in accordance with said third digital signals.

6. The system as defined in claim 5, wherein said third digital signals comprise first random amplitude data words and second random amplitude data words.

7. The system as defined in claim 6, wherein said random pulse means comprises:

(a) first multiplier means, responsive to said first noise generating means, for multiplying said high-pass-filtered digital noise words, and said first random amplitude data words to produce first product words; and (b) second multiplier means, responsive to said second noise generating means, for multiplying said low-pass-filtered digital noise words and said second random amplitude data words to produce second product words.

8. The system as defined in claim 7, wherein said summing means comprises means for summing said first product words and said second product words to produce said summed noise words.

9. The system as defined in claim 7, wherein a random pulse means comprises:

(a) port means, responsive to said hardware-controller means, for receiving said first random amplitude data words and said second random amplitude data words;

(b) storing means, responsive to said port means, for storing said first random amplitude data words and said second random amplitude data words;

(c) first presenting means, responsive to said storing means and said hardware controller means, for providing said first random amplitude data words to said first multiplier means in accordance with said third digital signals; and (d) second presenting means, responsive to said storing means and said hardware-controller means, for providing said second random amplitude data words to said second multiplier in accordance with said third digital signals.

10. A method of digitally synthesizing sounds, which comprises the steps of:

(a) generating first digital signals, including first data signals, first address signals, and first control signals;

(b) generating second digital signals including second data signals, second address signals, and second control signals, in accordance with said first digital signals and a stored programs;

(c) generating third digital signals including third data signals, third address signals, and third control signals in accordance with said second digital signals;

(d) synthesizing fourth digital signals, said fourth digital signals comprising samples of digitally synthesized hydrophone-lowering sounds, in accordance with said third digital signals in which said synthesizing step comprises the steps of:

(1) generating high-pass-filtered digital noise words in accordance with said third digital signals, (2) generating low-pass-filtered digital noise words in accordance with said third digital signals, (3) imparting first random pulsations to said high-pass-filtered digital noise words to produce high-pass-filtered digital noise words, (4) imparting second random pulsations to said low-pass-filtered digital noise words to produce low-pass-filtered digital noise words, and (5) summing said first high-pass-filtered digital noise words and said first low-pass-filtered digital noise words to produce summed noise words; and (e) converting said fourth digital signals to analog output signals.

\* \* \* \* \*